United States Patent [19]
Bricaud et al.

[11] Patent Number: 6,149,466
[45] Date of Patent: Nov. 21, 2000

[54] COMPACT SMART CARD ELECTRICAL CONNECTOR

[75] Inventors: Hervé Guy Bricaud; Yves Pizard, both of Dole, France

[73] Assignee: ITT Manufacturing Enterprises, Inc., Wilmington, Del.

[21] Appl. No.: 09/438,681

[22] Filed: Nov. 12, 1999

Related U.S. Application Data

[63] Continuation-in-part of application No. PCT/FR98/00932, May 11, 1998.

[30] Foreign Application Priority Data

May 13, 1997 [FR] France ................................... 97 05808

[51] Int. Cl.[7] .................................................. H01R 24/00
[52] U.S. Cl. .......................... 439/630; 439/326; 439/862; 235/441
[58] Field of Search ...................................... 439/630, 326, 439/331, 862; 631/737; 235/441, 475, 476, 479, 482, 483, 492

[56] References Cited

U.S. PATENT DOCUMENTS

| | | | |
|---|---|---|---|
| 3,883,856 | 5/1975 | Saito et al. | 439/326 |
| 5,603,629 | 2/1997 | DeFrasne et al. | 439/326 |
| 5,813,878 | 9/1998 | Kuwata et al. | 439/326 |
| 5,961,338 | 10/1999 | Wu et al. | 439/326 |
| 5,984,707 | 11/1999 | Kuwata | 439/326 |
| 6,024,593 | 2/2000 | Hyland | 439/326 |

*Primary Examiner*—Paula Bradley
*Assistant Examiner*—Tho D. Ta
*Attorney, Agent, or Firm*—Thomas L. Peterson

[57] ABSTRACT

A smart card connector includes a base (36) that holds contacts (38) and a cover (76) with a rear end pivotally connected to the base and a front end that receives a card into a cavity or card receiver (31). The base is narrow, and laterally opposite sides of the cover move down on opposite sides of the base when the cover is lowered. The cover is a one-piece molded plastic part with a rear plate (116) that lies over the rear of the card, and with the front of the cavity being open. A locking bar (140) has a plate lying over the front of the cavity, the locking bar being slideable forwardly to lock the cover in the closed position.

15 Claims, 26 Drawing Sheets

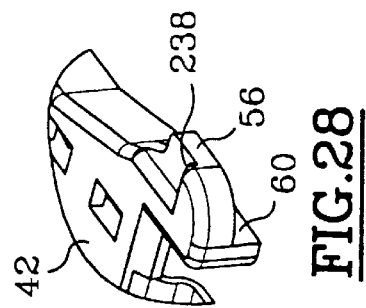
FIG.28
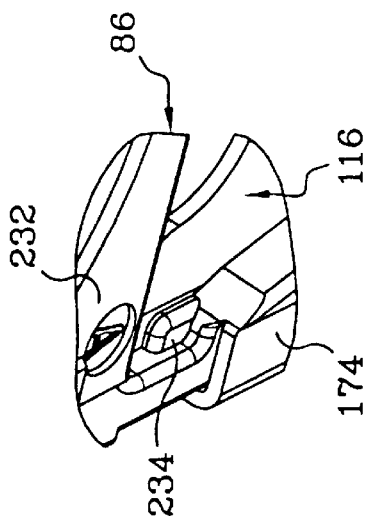
FIG.29
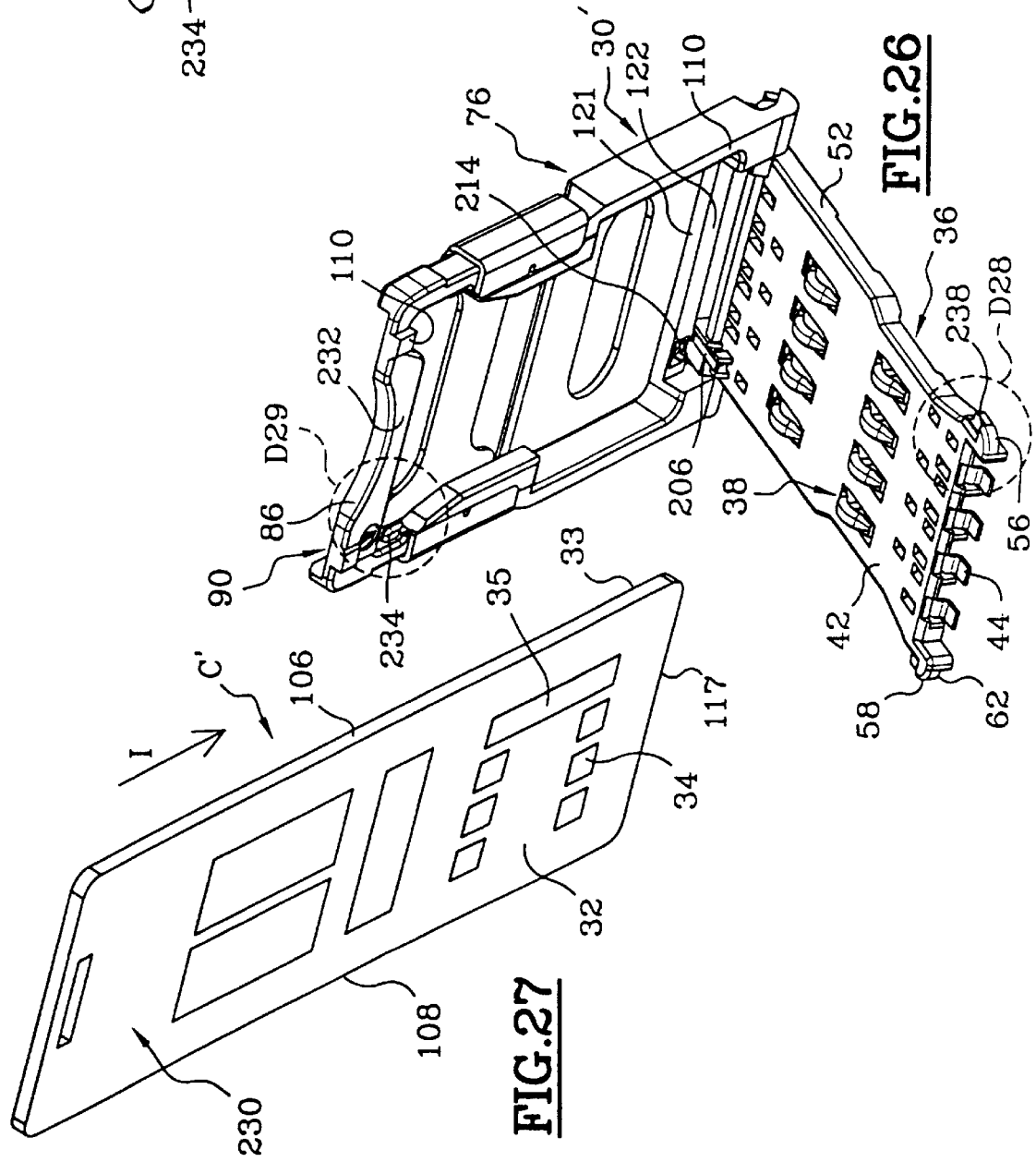
FIG.26
FIG.27

COMPACT SMART CARD ELECTRICAL CONNECTOR

CROSS REFERENCE

This is a continuation-in-part of PCT application PCT/FR98/00932 filed May 11, 1998 which claims priority from French application Serial Number 97/05808 filed May 13, 1997.

BACKGROUND OF THE INVENTION

Smart cards are formed of a plastic plate having about the same thickness as a credit card, with an integrated circuit imbedded in the plastic and with contact pads on a surface of the card. Such cards come in different sizes, with the large size being about the size of a credit card and with a popular small size being referred to as a MICROSIM card. The smart cards are inserted into connectors that make contact with the contact pads of the card to read data into and out of the card. The cards are commonly used to authorize transactions such as purchases of goods at a store, and for identification as to allow operation of an automobile radio. It is desirable that the connector be of small size and be constructed of a minimal number of parts.

SUMMARY OF THE INVENTION

In accordance with one embodiment of the present invention, apparatus is provided for connection to a smart card, with the apparatus being of small size and having a minimum number of different parts. The apparatus includes a largely plate-shaped plastic base having an upper face, and a plurality of contacts mounted on the base. The contacts have pad engaging parts which project above the upper face of the base. A plastic cover has a rear end pivotally connected to the base to pivot between raised and lowered cover positions. The cover has a cavity forming a card receiver for receiving a smart card, so the pads of the card engage the contacts when the cover is in its lowered position. A rear half of the cover has an upper plate at the top of the cavity to hold down the rear half of the card, while the front half of the cover is open above the cavity. A locking bar that is slideably mounted on the cover, has a thin plate that lies over the front half of the cavity to hold down the front of the card. The locking bar can be slid forward when the cover has been pivoted down, to lock the cover in its down position. The cover has a greater width than the base, and the cover has opposite side walls that move on opposite sides of the base, below the upper face of the base, when the cover is in its lowered position.

The novel features of the invention are set forth with particularity in the appended claims. The invention will be best understood from the following description when read in conjunction with the accompanying drawings.

BRIEF DESCRIPTION OF THE DRAWINGS

FIG. 26 is a view similar to that of FIG. 8, showing a connector of another embodiment of the invention wherein the front end of the base does not have a polarizing finger so as to allow a special card to be accommodated.

FIG. 27 is an isometric view of a special card of greater longitudinal length than the card shown in previous figures, and which can be inserted into the connector of FIG. 26.

FIGS. 28 and 29 are enlarged views of details D28 and D29 shown in FIG. 26.

DETAILED DESCRIPTION OF THE INVENTION

I. Limited Description of the Invention.

Figure 12:
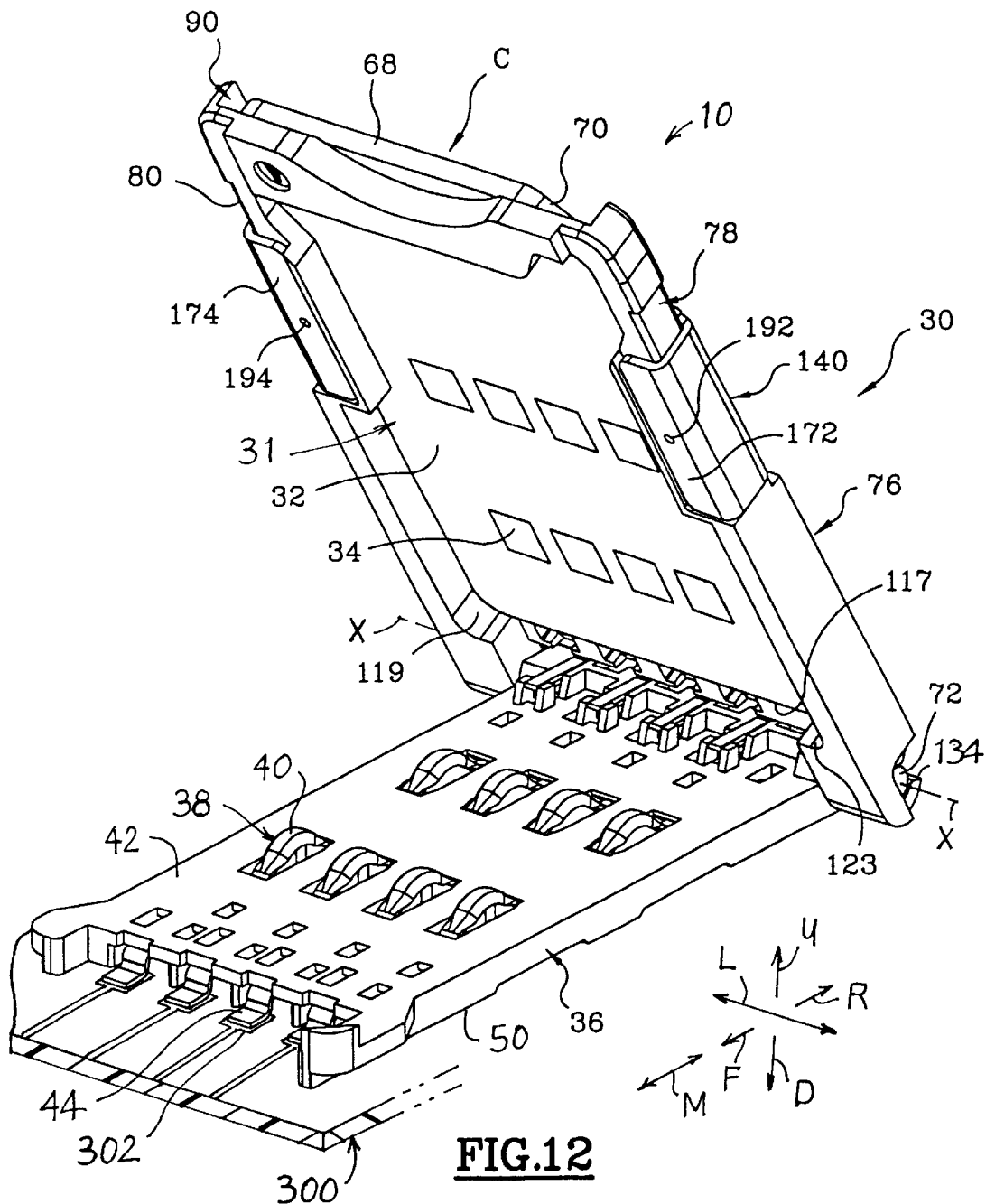
FIG. 12 is a view similar to that of FIG. 8, with a card fully inserted into the cover and with the base shown mounted on a circuit board.

FIG. 12 illustrates an electrical connector 30 for receiving a smart card C, and for making connections to contact pads 34 that lie on a lower face 32 of the card. The connector 30 includes a largely plate-shaped base 36 constructed of insulating plastic which serves as a support for a group of contacts 38 of conductive material. The base is shown lying on an upper face of a circuit board 300. The connector also includes a cover 76 that is also molded of insulative plastic material, and which has a rear end pivotally mounted about an axis X—X on a rear end of the base. The cover forms a cavity 31 that receives the card C when the cover is pivoted to its raised position in FIG. 12. The cover can be moved down to a lowered cover position so the contact pads 34 on the card engage pad-engaging ends 40 of the contacts. When the cover has been moved down to its lowered position, a locking bar 140 that forms a latch to keep the cover closed, is slid forwardly F to lock the cover in its lowered position.

Figure 3:
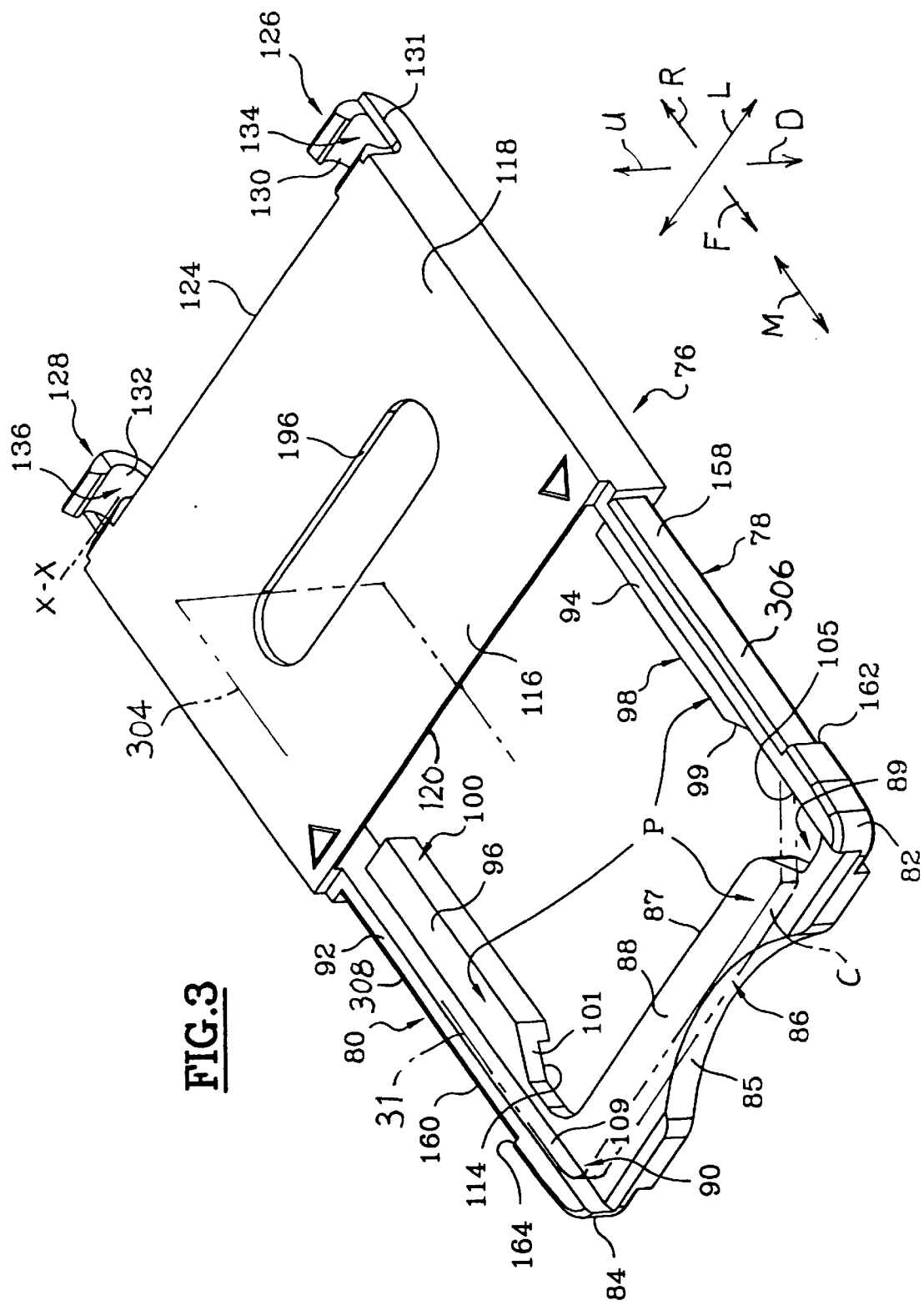
FIG. 3 is an isometric view of the cover of the connector, without the locking bar thereon.

FIG. 3 shows only the cover 76, which is a one-piece molded plastic part. The cover forms a card receiving cavity 31, having a volume occupied by the smart card C in the fully inserted position of the card. The cover has a rear portion of about half the card length, forming a thin upper plate 116 that lies over the rear half of the cavity to push down the rear half of the card against the contacts. The cover front portion of about half the card length is open in an upward direction, although it is largely closed by the locking bar. The cover is largely symmetrical about a vertical center plane 304 that is normal to the lateral direction L. The cover has laterally L opposite sides 306, 308, with opposite side walls 78, 80 thereat.

Each side wall 78, 80 of the cover forms a vertical (when the cover is lowered) edge guide surface 109 that engages a side edge of the card to guide the card into its fully inserted position. Each side wall has an upper face 92 at the top of the edge guide surface, and has a guide face 96 spaced below the upper face by slightly more than the thickness of the card, to support opposite sides of the lower face of the card during rearward R card insertion and thereafter. As shown in the upside-down view of FIG. 4, the edge guide 109 extends along the entire length of the cavity 31, with the rearward extensions of the edge guides indicated at 111, 113. FIG. 3 shows that the rear half of the card is pressed down by the upper plate 116 while the front half of the card is not pressed down by the cover (although the locking bar presses it). The bottom surface of the card is supported by the guide faces 96 only along the front half of the card, with the guide face 96 ending at about the front edge of the plate 116.

Figure 7:
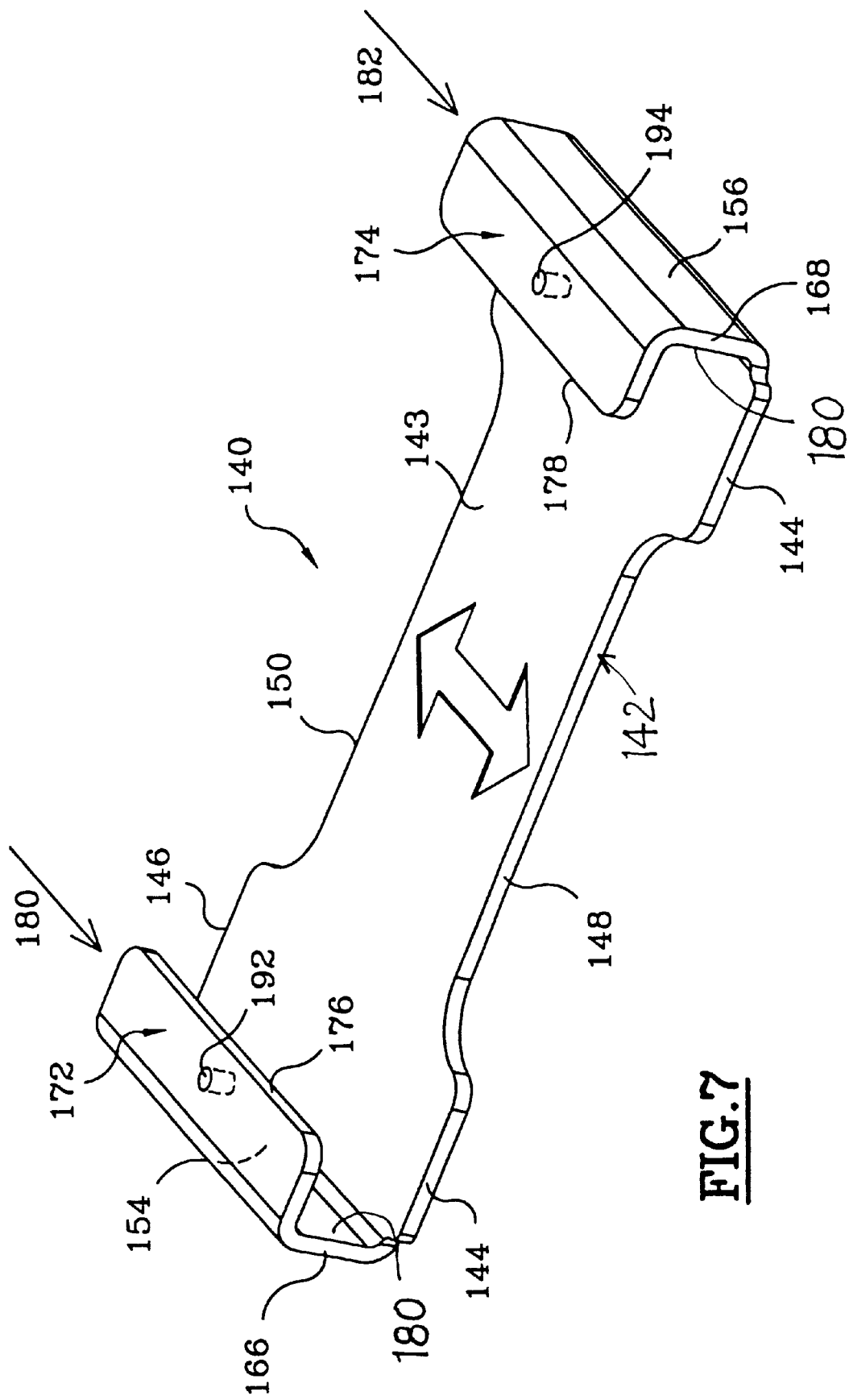
FIG. 7 is an upside-down isometric view of the locking bar of the connector of FIG. 1.
Figure 8:
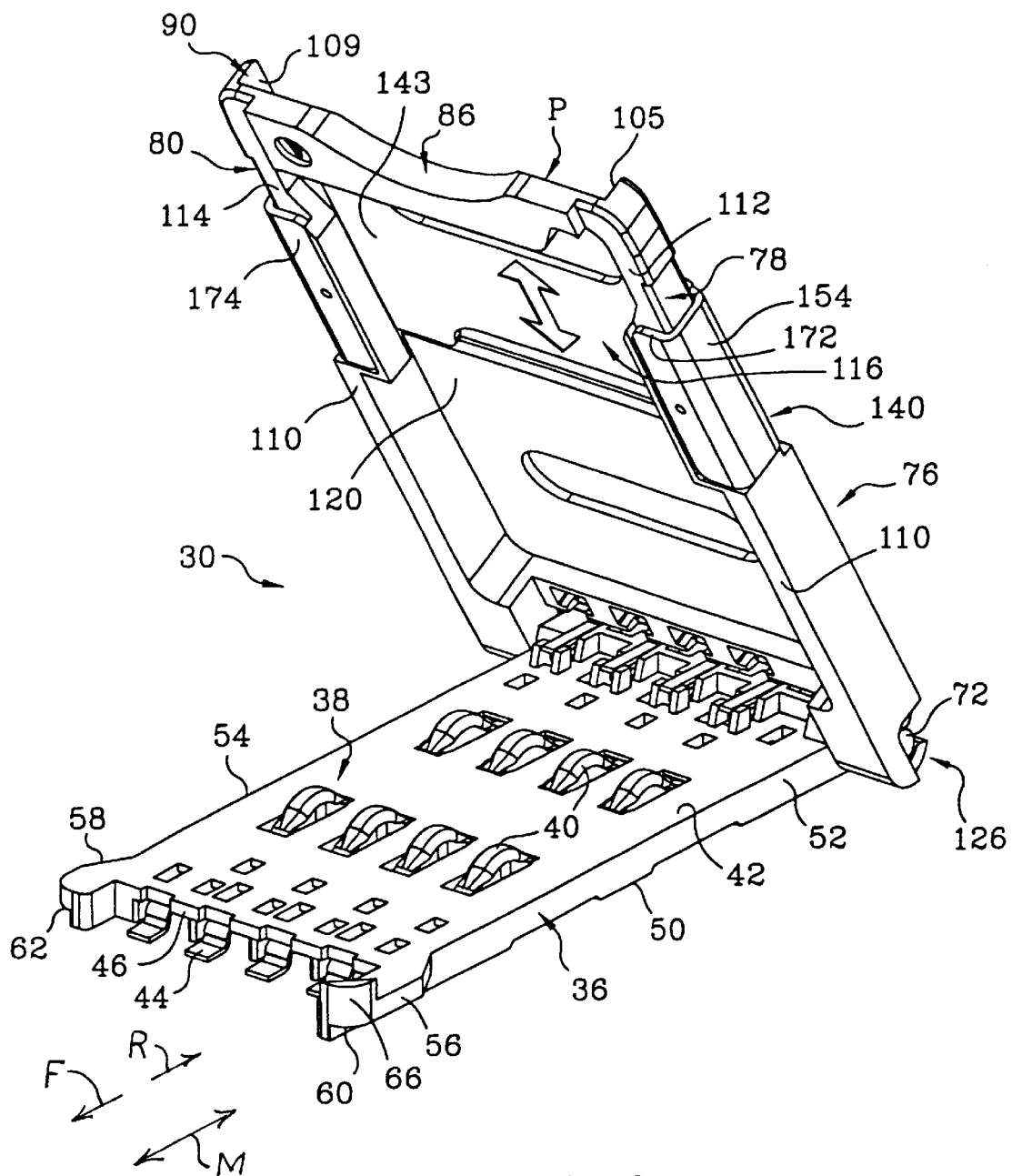
FIG. 8 is an isometric view of the connector of FIG. 1 with the cover in an open position and the locking bar in an unlocked position, and without the card.
Figure 9:
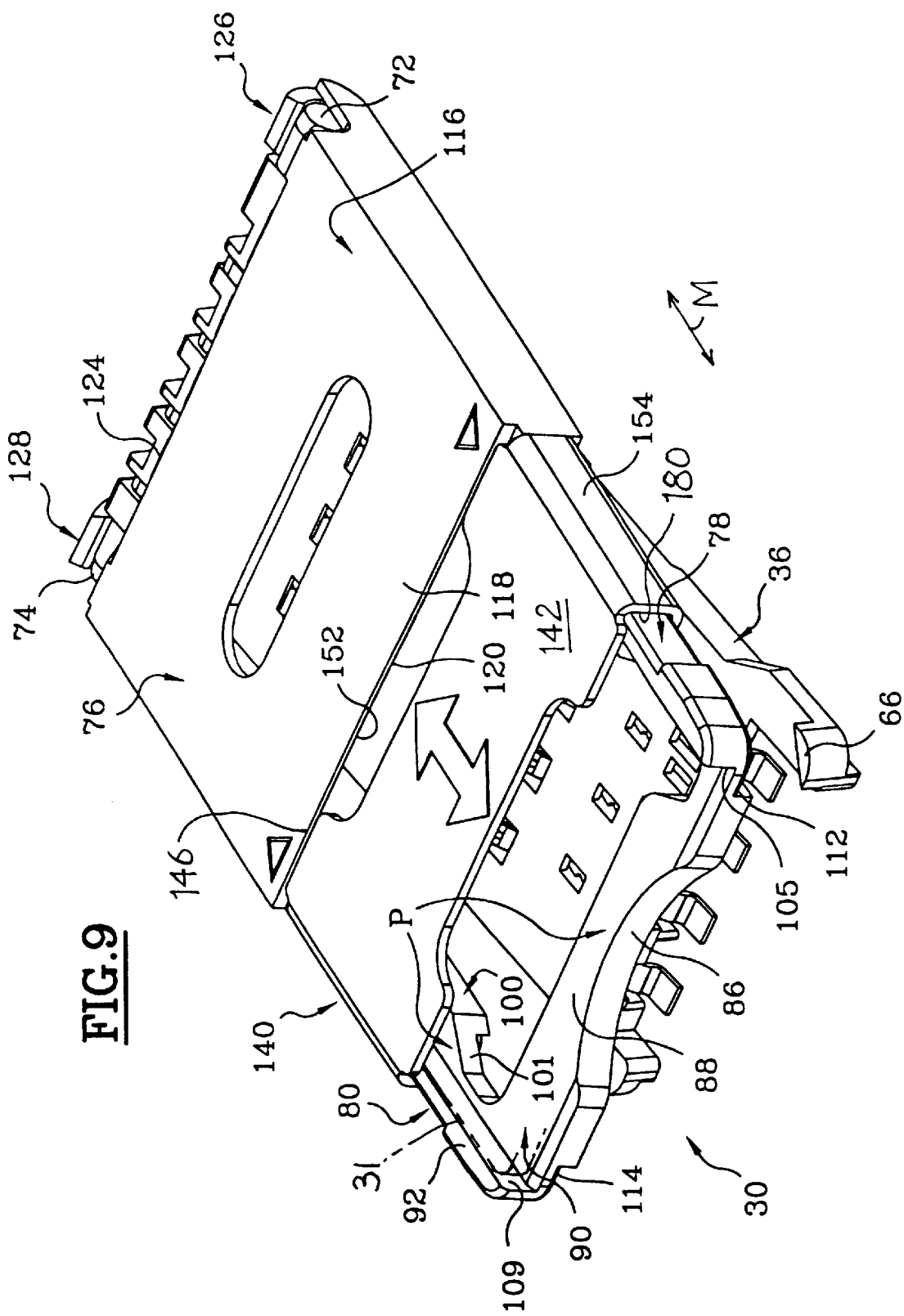
FIG. 9 is a view similar to that of FIG. 8, but with the cover in an almostclosed position.

FIG. 9 shows that the locking bar 140 has a plate-shaped upper part 142 that extends across the card-receiving cavity 31 to hold down the front half the card. The locking bar 140 is formed from a piece of sheet metal, with laterally opposite sides bent to form channels 180. The side walls 78, 80 of the cover form guides for the locking bar, and the channels 180 extend around the side walls to hold the cover in place. FIG. 7 shows that the cover has laterally opposite sides that are bent into U-shapes to surround parts of the side walls of the cover in sliding movement. The channels 180 at the opposite sides of the mounting bar can be slightly spread apart for installation on the cover.

Figure 4:
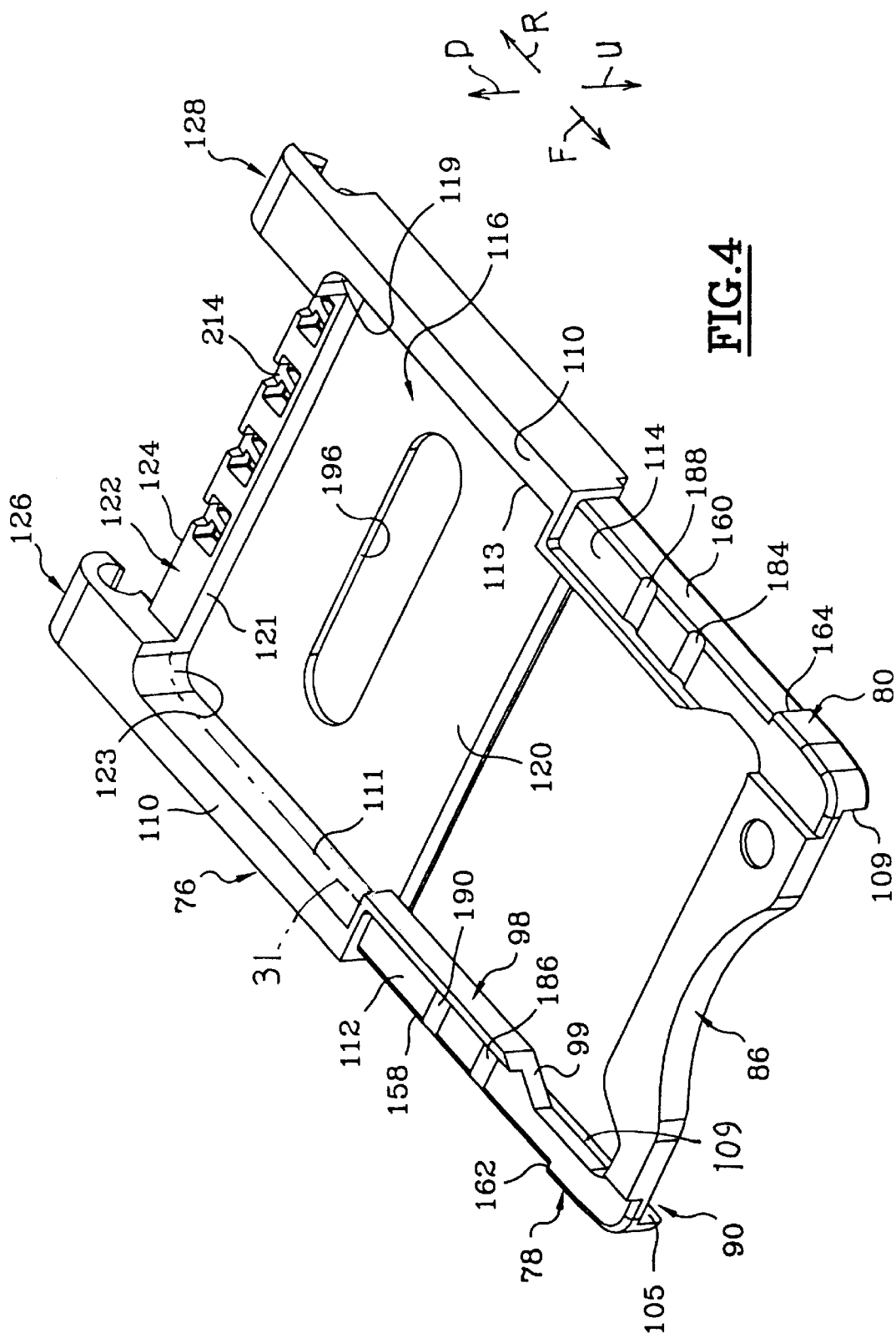
FIG. 4 is an upside-down isometric view of the cover of FIG. 3.
Figure 6:
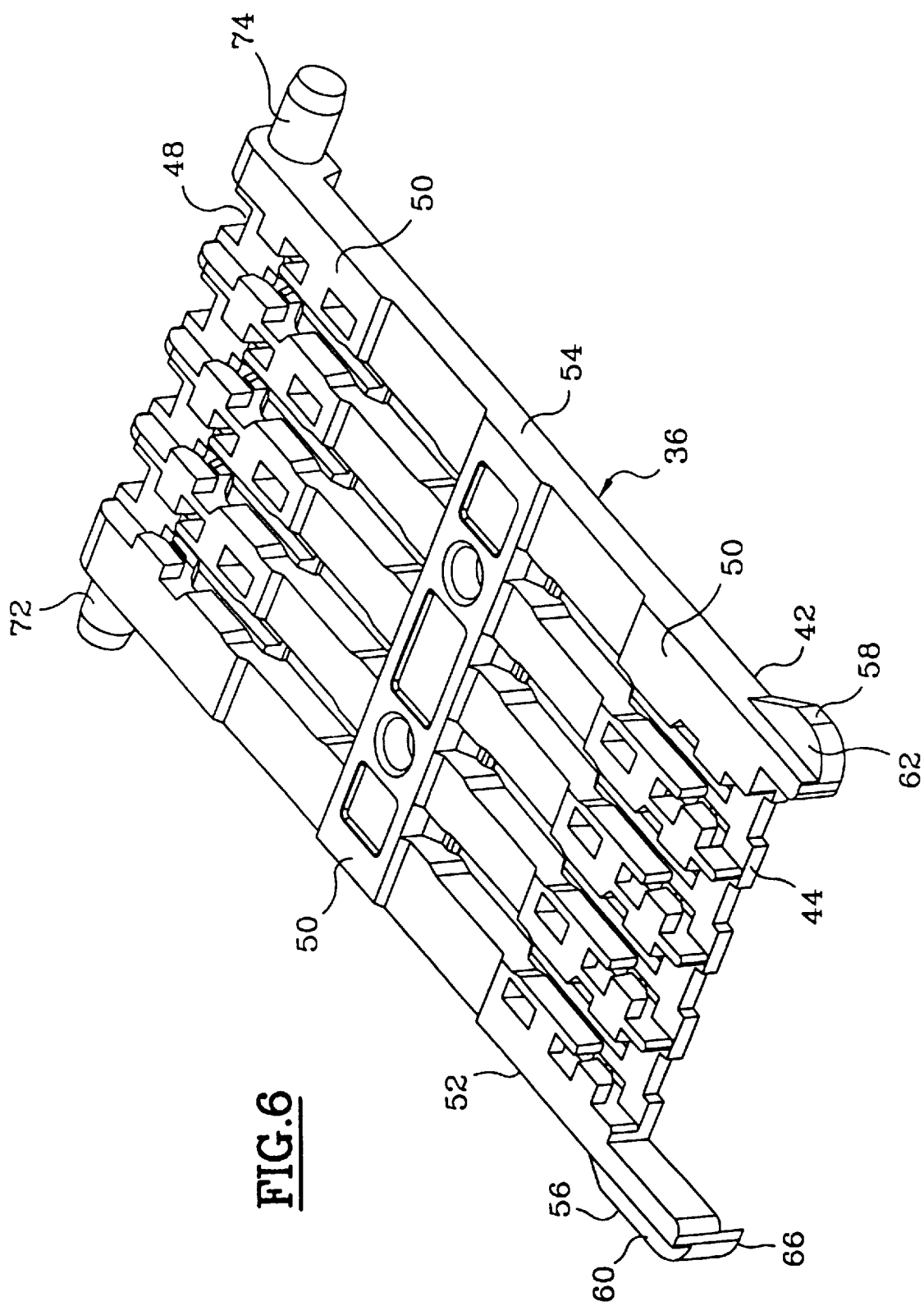
FIG. 6 is an upside-down isometric view of the base of FIG. 5.
Figure 14:
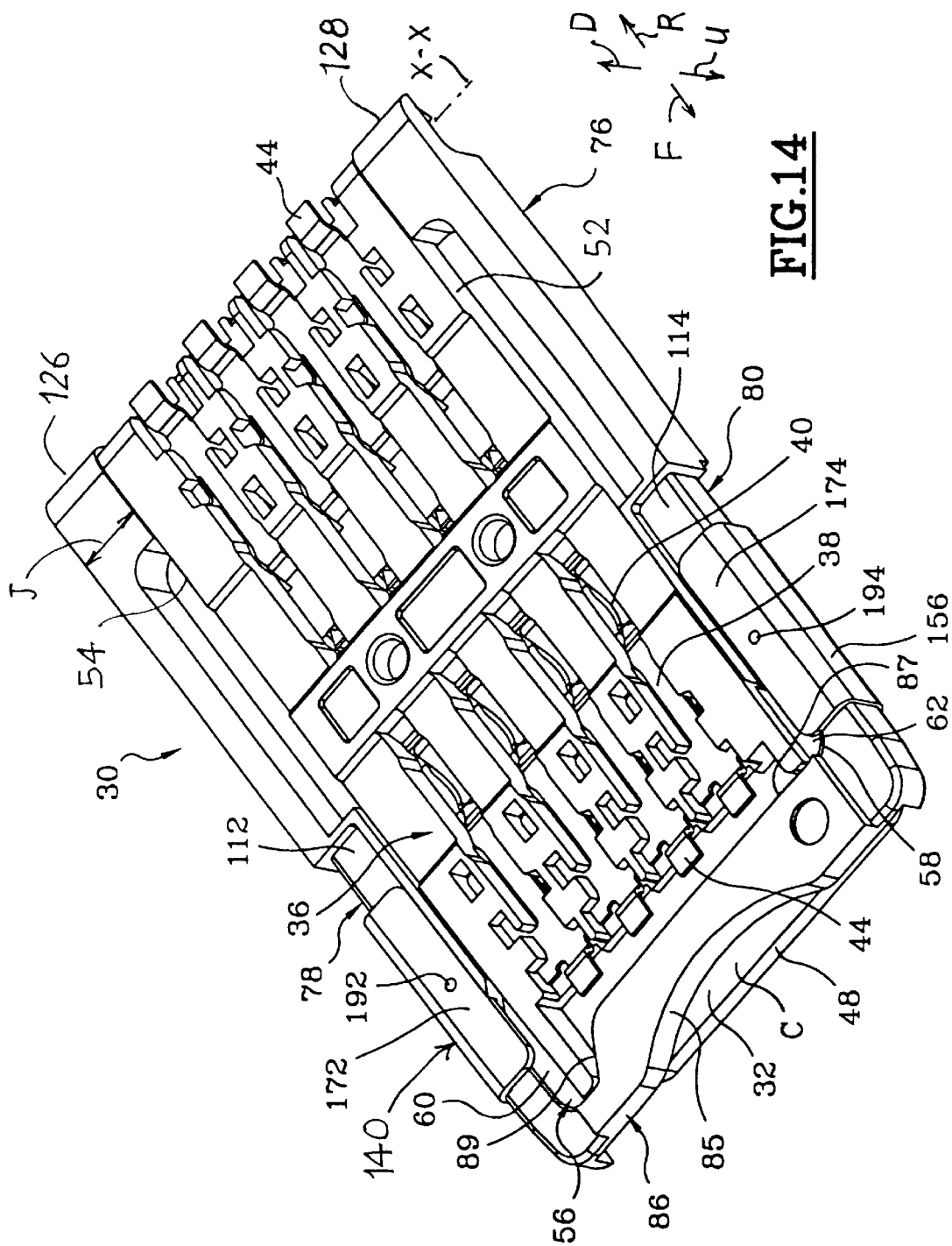
FIG. 14 is an upside-down isometric view of the connector of FIG. 13.
Figure 15:
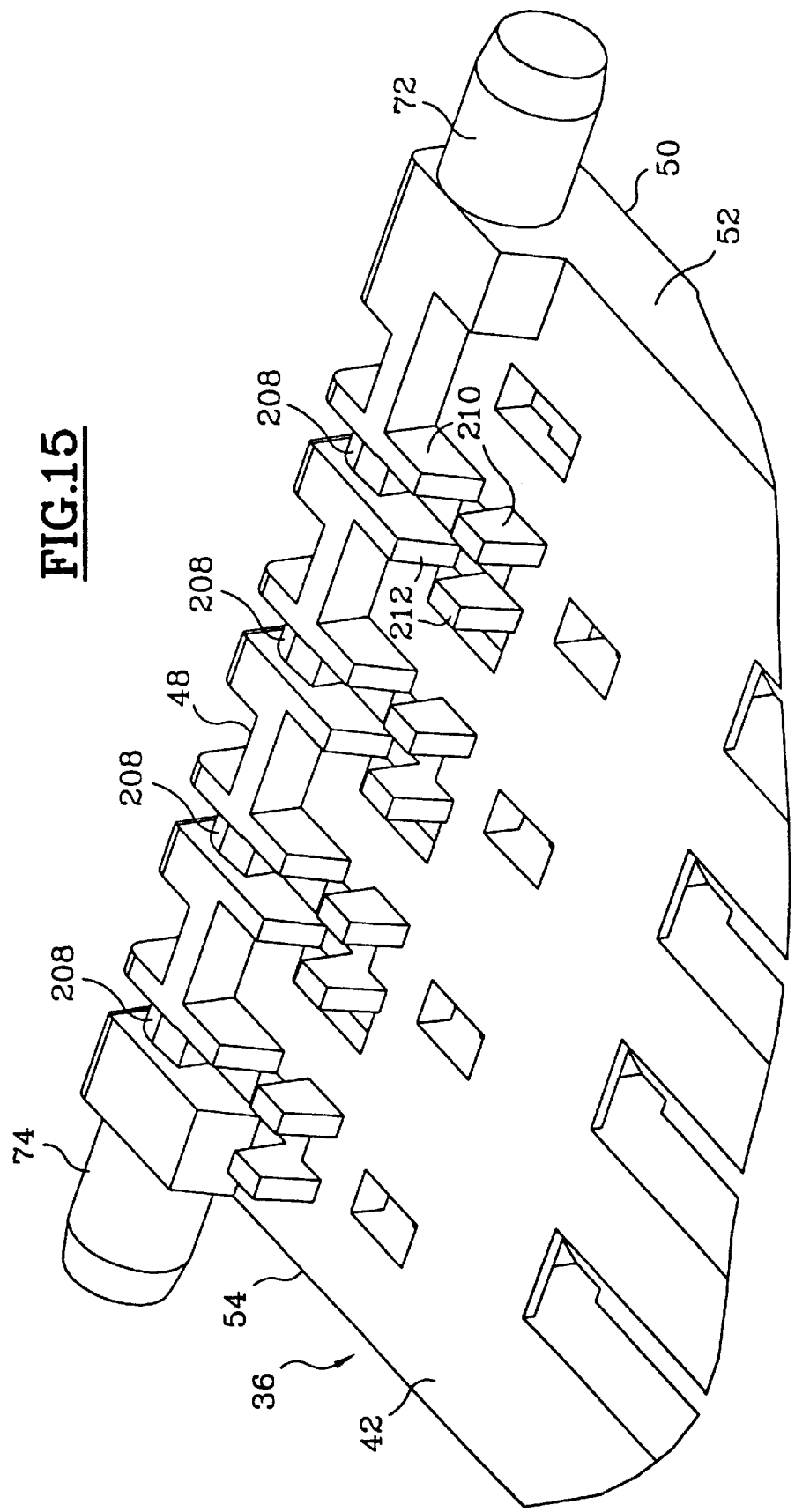
FIG. 15 is an enlarged front isometric view of a portion of the rear part of the base of the connector, without the contacts.

FIG. 6 is an upside-down view of the base 36 whose lower face 50 is usually mounted facewise on the circuit board. The base has latch lugs 56, 58 at laterally opposite sides of its front end, the lugs having lower faces 60, 62. FIG. 14 is an upside-down view of the connector, with the cover closed, and with the locking bar 140 slid to its forward locking position. Locking tabs 172, 174 at the opposite channels of the locking bar, have moved under the lower faces 60, 62 of the lugs on the base to lock the cover down against the base. It may be noted that the locking bar has short pins 192, 194. FIG. 4 shows that the lower surface of the cover has a pair of front notches 84, 86 and a pair of rear notches 188, 190. The pins on the locking bar tend to remain in one of the pair of notches, so the locking bar resists sliding between its front and rear positions, although the locking bar can be slid by forcing it to slide. The pins provide an audible and tactile sensation when locking and unlocking the locking bar.

Figure 5:
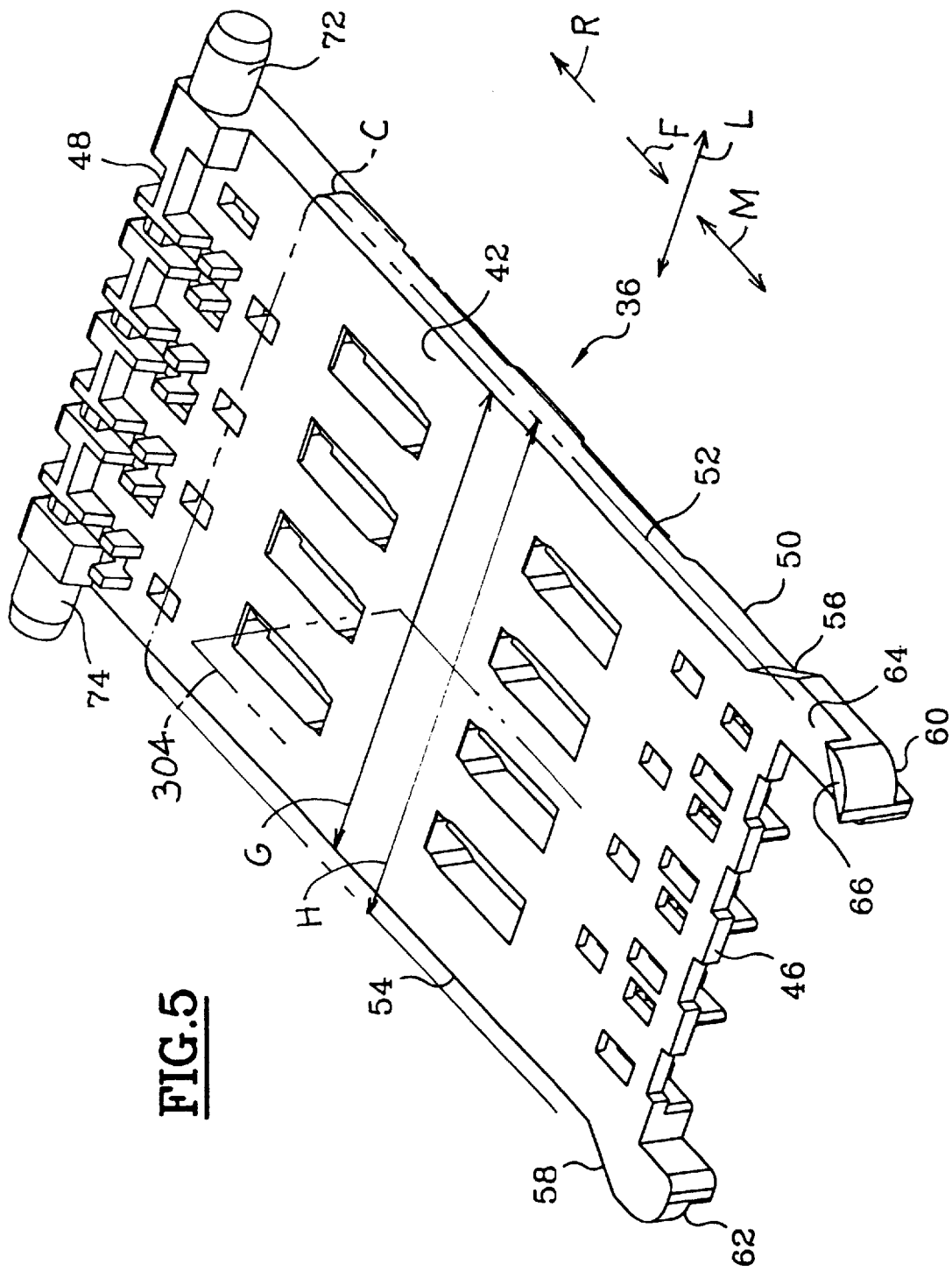
FIG. 5 is a top isometric view of the base of the connector, without the contacts thereon.

FIG. 5 shows that the base 36 has a relatively small width G of about 12 mm along most of its longitudinal M length. This width G is less than the width H of the card C.

The front of the base forms the outwardly (away from the center plane 304) projecting lugs 56, 58 which are engaged by the locking bar. One lug has a polarizing finger 66 that assures that the smart card is inserted in a proper orientation. The rear of the card has a pair of pivot pins 72, 74 projecting outwardly from the rest of the base. As shown in FIG. 3, the cover has a pair of arms 126, 128 with passages or recesses 130, 132 that receive the pivot pins 72, 74 (FIG. 5) of the base. The cover is mounted on the base by aligning slots 134, 136 (FIG. 3) in the cover arms with the pivot pins and snapping the arms into place.

FIG. 14, which is an upside-down view of the complete connector, shows that the side walls 78, 80 of the cover lie outside opposite sides 52, 54 of the base 36, and below the upper face of the base. The arms 126, 128 that pivotally connect the cover to the base, each have a width J of about 2.5mm to provide strength. The locking bar 140 has side walls 156 that extend laterally about as far as the arms 126, 128. The construction of the connector where the cover has opposite sides that move down to positions at laterally opposite sides of the base, results in a cover of small width. As shown in FIG. 9, the width of the connector is equal to the width of the card-receiving cavity 31, plus twice the width of the side walls 78, 80 outside the edge guides 109 along the length where the locking bar 140 slides, plus the thickness of the sides 154 of the locking bar. The lateral widths of the side walls such as 78 of the cover and the side 154 of the sheet metal locking bar is small, resulting in a connector of overall small lateral width, such as 17.2 mm.

Figure 11:
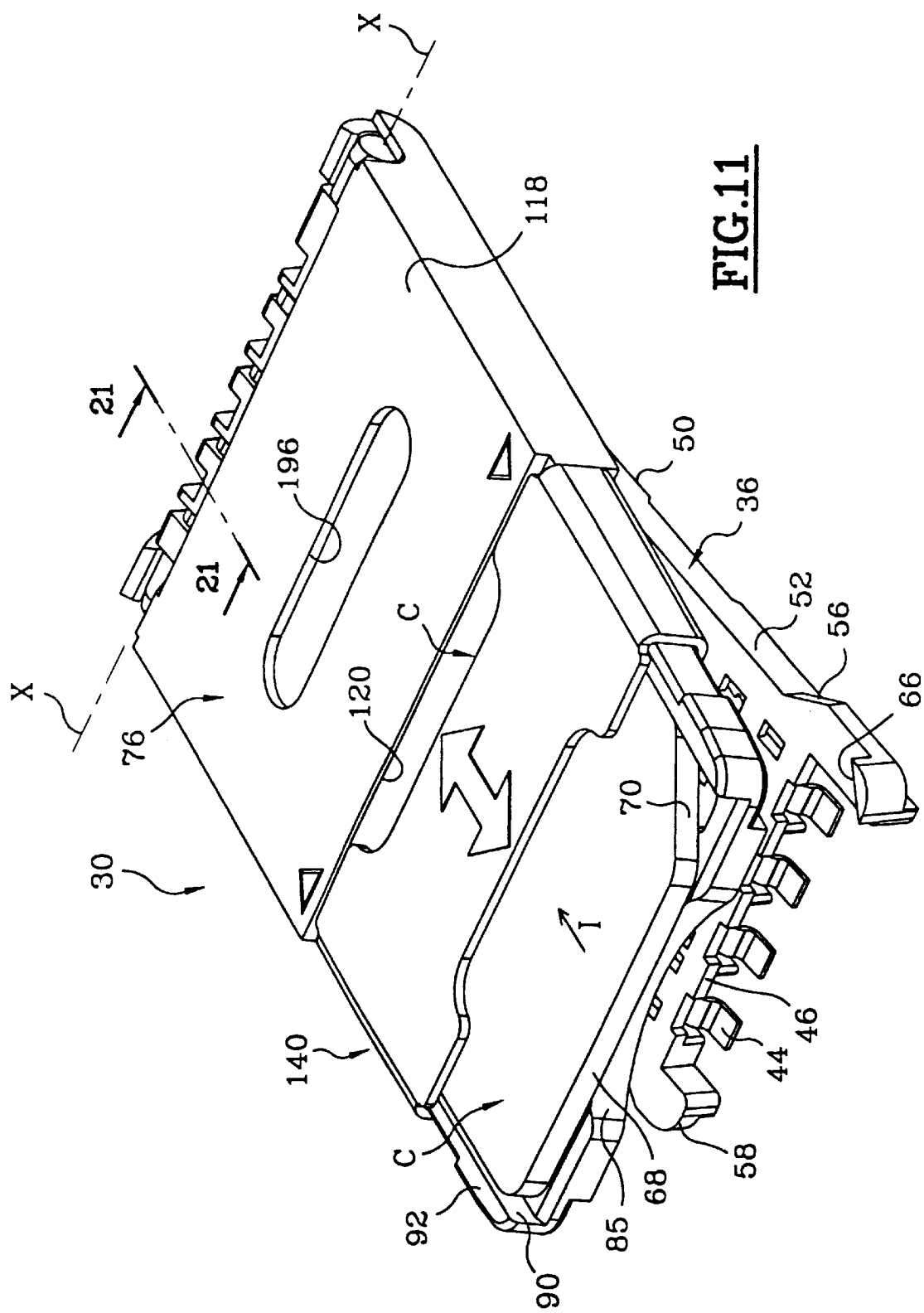
FIG. 11 is a view similar to that of FIG. 10, with the card fully inserted into the connector.
Figure 13:
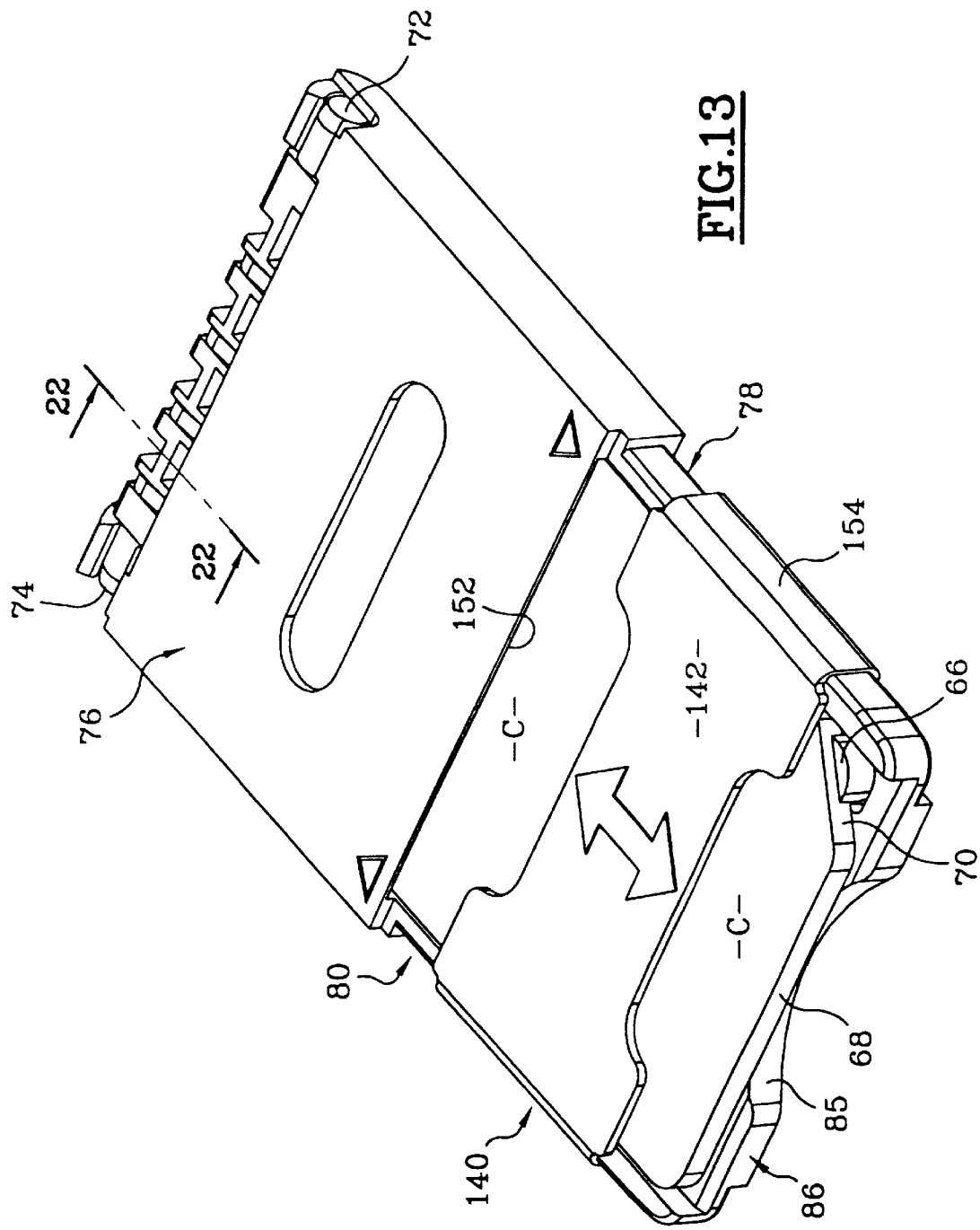
FIG. 13 is an isometric view of the connector with a card fully inserted into the cover and with the cover moved down to its closed position and the locking bar in its locked position.

FIG. 13 shows the cover 76 in its lowered position on the base, with a smart card C fully inserted into the cover, and with the locking bar 140 having been slid forward into its most forward, or locking position. It can be seen that the cover has a diagonal corner 70 which is cut away, compared to the slightly rounded largely rectangular other three corners of the card. The polarizing finger 66 that extends upwardly above the upper face of the base, projects through a slot in the cover, to lie slightly forward and to one side of the diagonal corner 70 of the card. This prevents the cover from closing if the card is inserted upside down or with its front end rearward. FIG. 11 shows the card fully inserted in the cover, but the cover not yet closed. If the card has not been inserted properly, then the cover will not close because the polarizing finger 66 is in the way.

Figure 1:
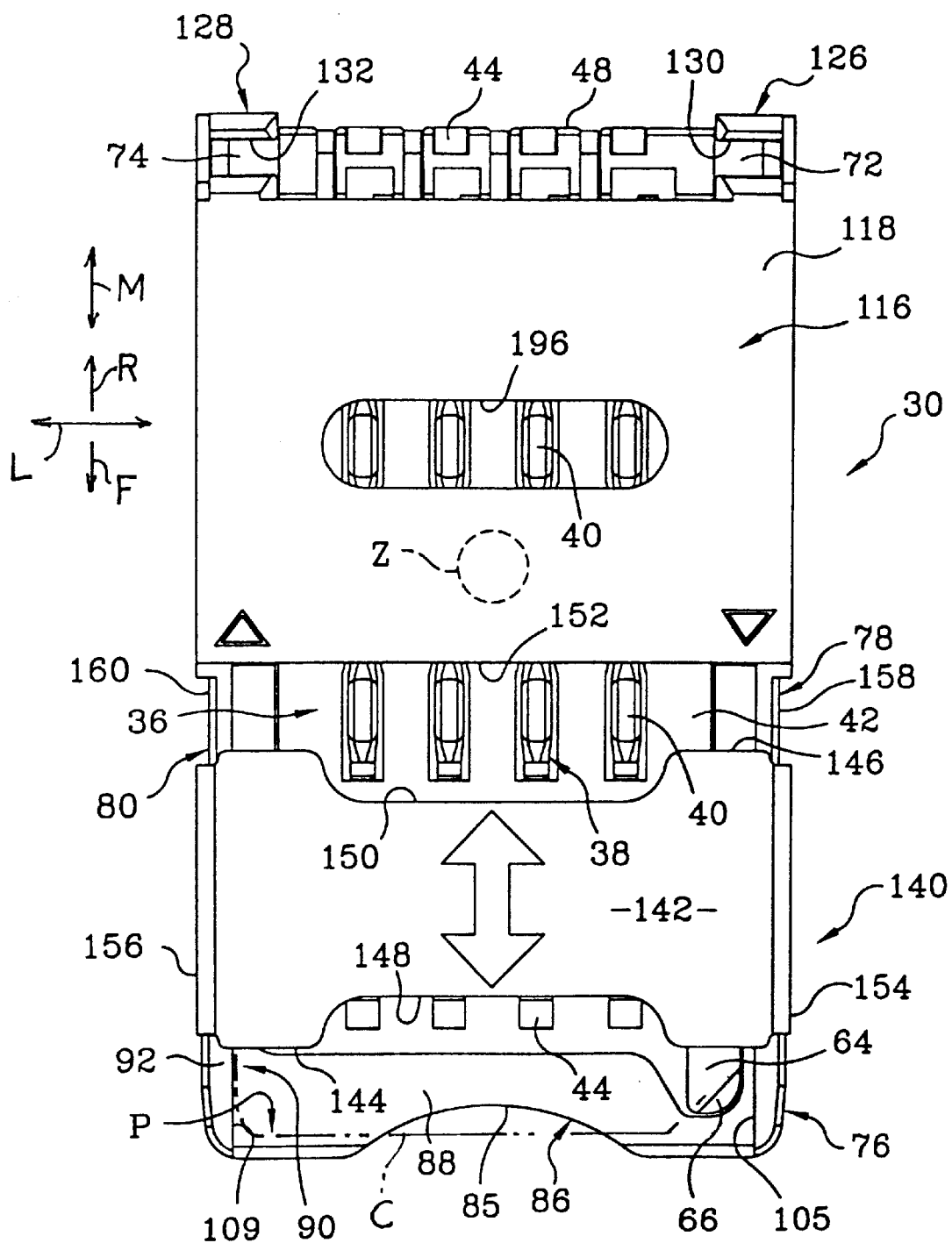
FIG. 1 is a plan view of an electrical connector of the invention, without a card, with the cover in closed position, and with the locking bar in a locked front position.

FIG. 1 shows the connector with the cover closed, but with the card C shown only in phantom lines. It can be seen that the upper plate 116 of the cover has a window 196. The window allows for direct access to the pad-engaging parts 40 of the four contacts, to allow for testing of the connector contacts. Also, the locking bar 140 is shown in its full forward position. Then, the pad-engaging parts 40 of the frontmost row of contacts are accessible so they also can be tested. It is noted that the cover has a spot Z at its center of gravity, where the cover can be picked up by a vacuum pick up for automatic handling of the cover during assembly of the connector.

Figure 17:
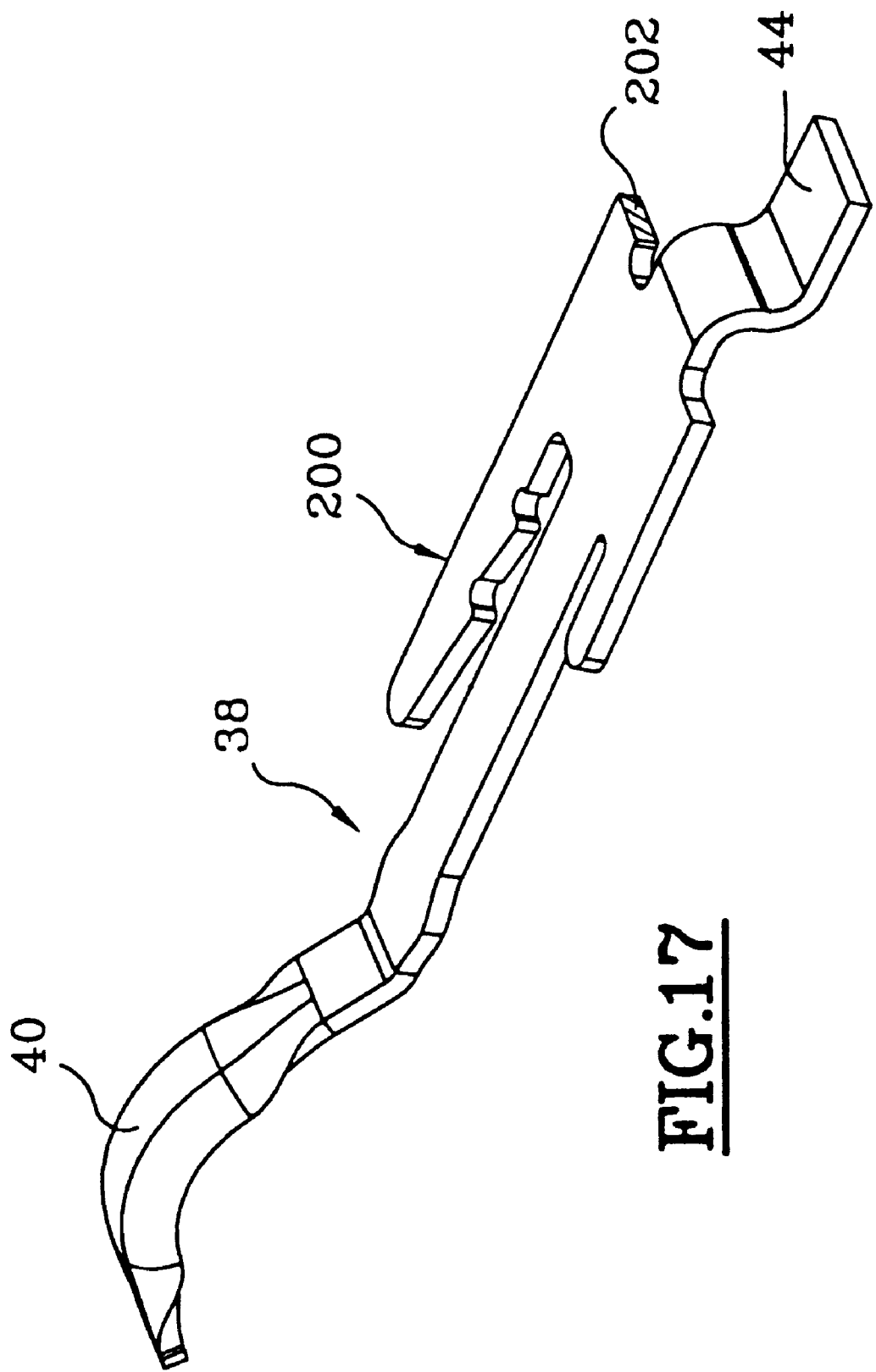
FIG. 17 is an isometric view of an electrical contact of the type that is mounted on the front part of the base
Figure 18:
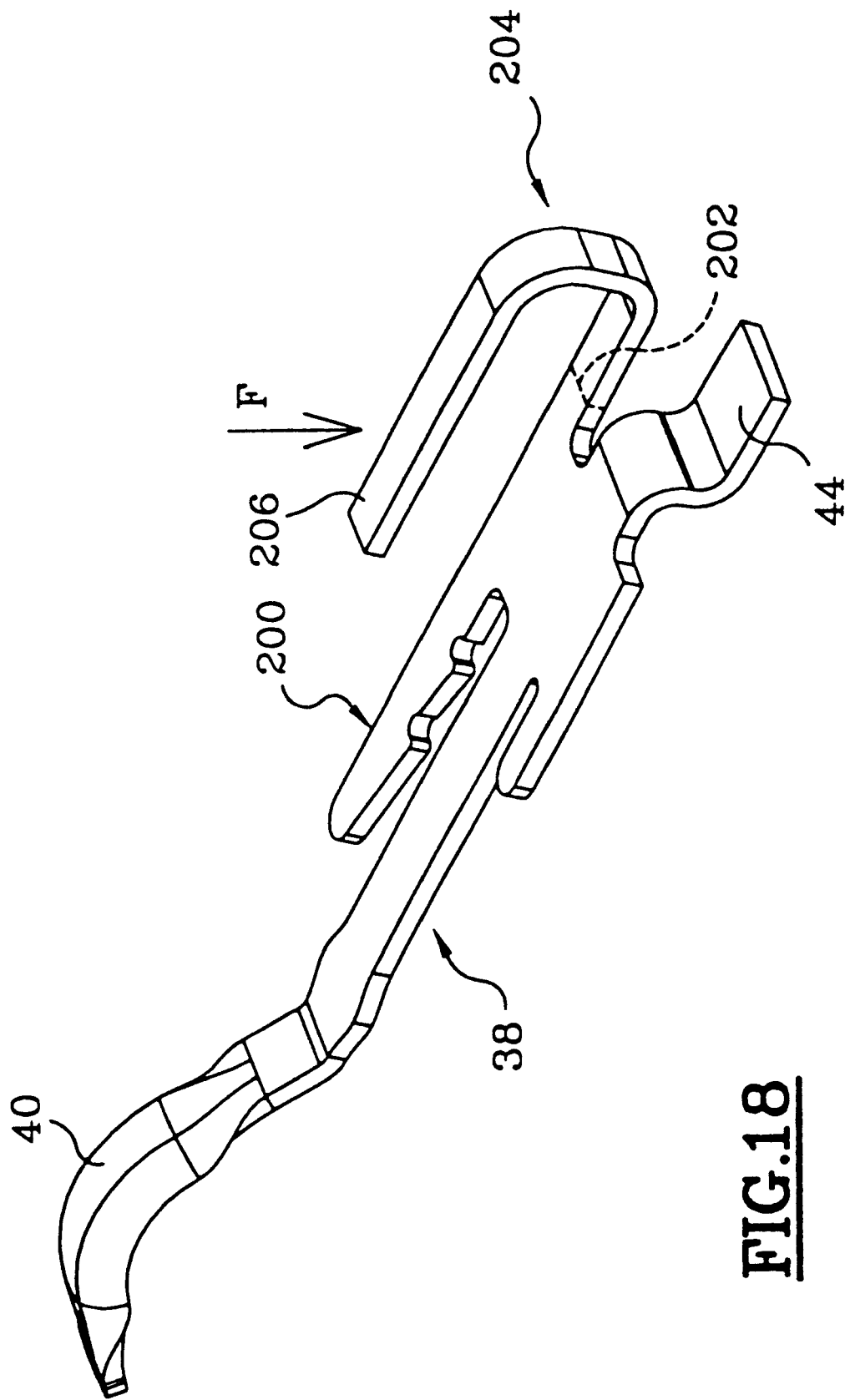
FIG. 18 is an isometric view of an electrical contact of a type that is mounted on the rear of the base, showing a bent-over contact part that forms a spring beam.

FIG. 17 shows one of the contacts 38 of the frontmost row of four contacts of the connector. The connector has a lateral tab 200 in the form of a harpoon that allows the contact to be installed by forcefully pressing the contact rearwardly into a slot formed in the base. The lateral tab has a rear edge 202 that is cut off for the front contacts, but not for the rear contacts. FIG. 18 shows one of the rear contacts, which is of the same construction as the front contacts, except that it has an elongated tab that is bent by about 180° to form a spring beam 206 that upwardly biases the cover towards its raised position.

Figure 16:
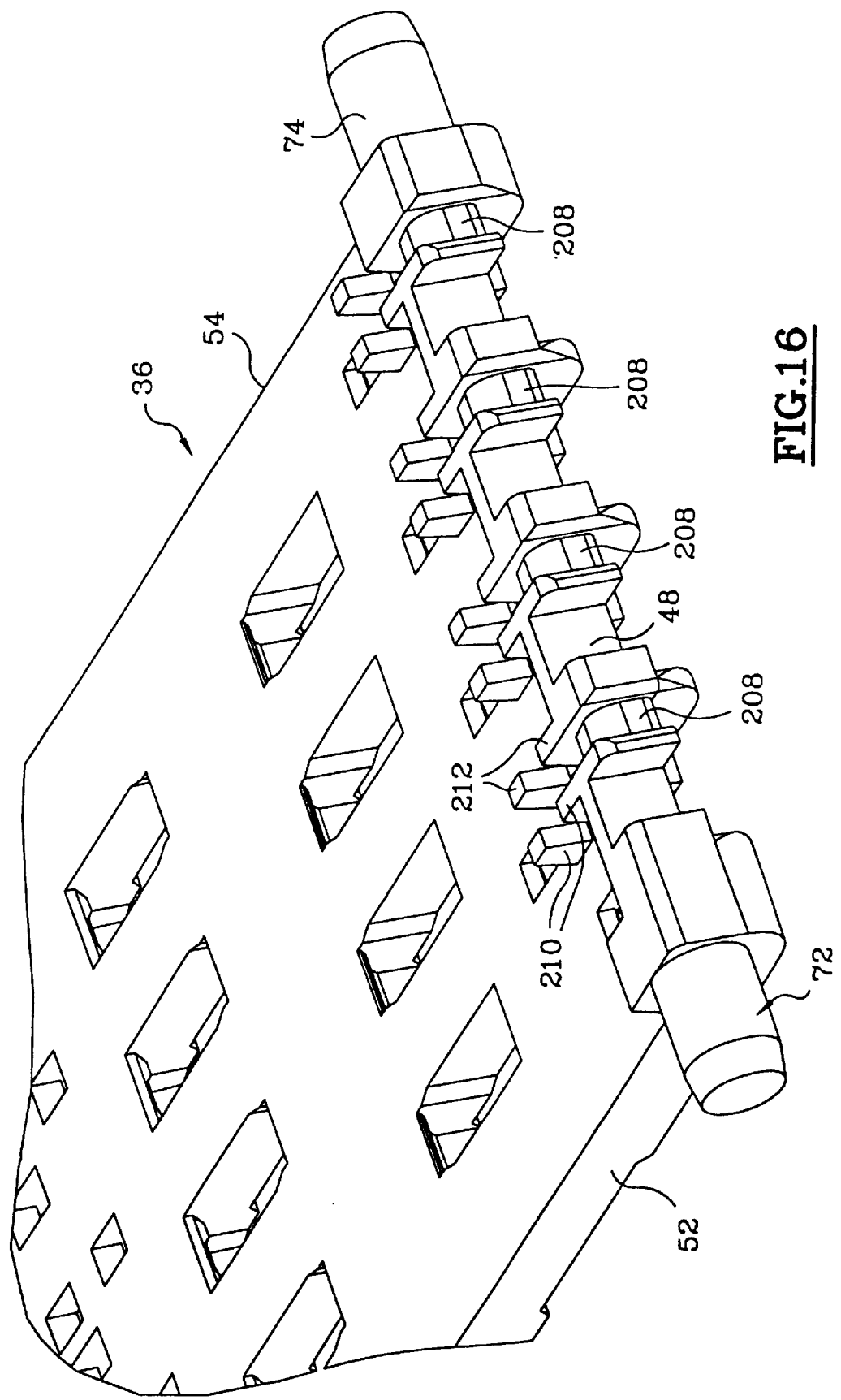
FIG. 16 is a rear isometric view of the portion of the base shown in FIG. 15.
Figure 19:
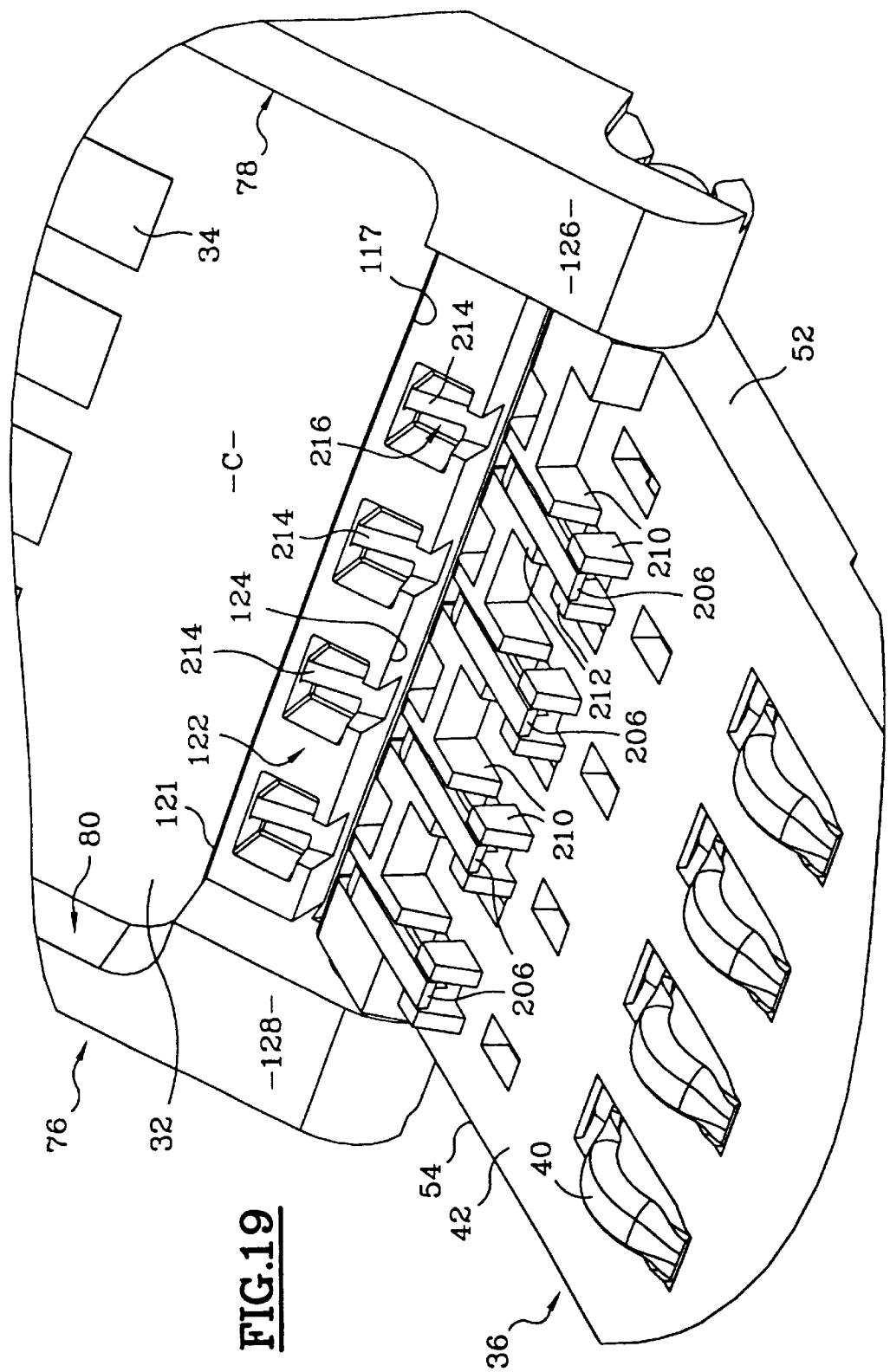
FIG. 19 is a partial isometric view of the rear part of the connector, with the contacts in place and the cover open.
Figure 20:
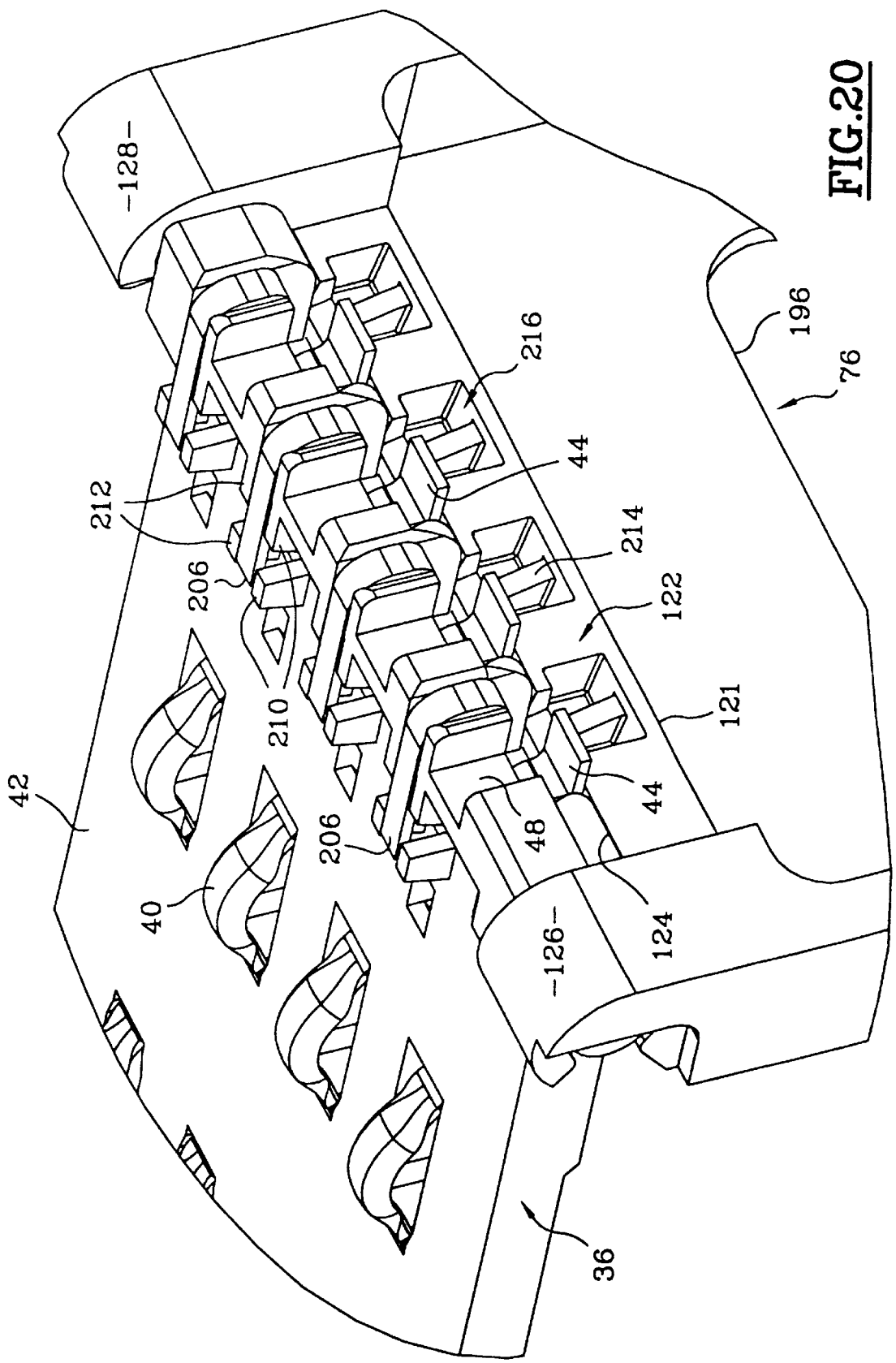
FIG. 20 is a rear view of the connector parts shown in FIG. 19, but with the cover rotated to extend downward from the rear end of the base, this position generally not being used.
Figure 21:
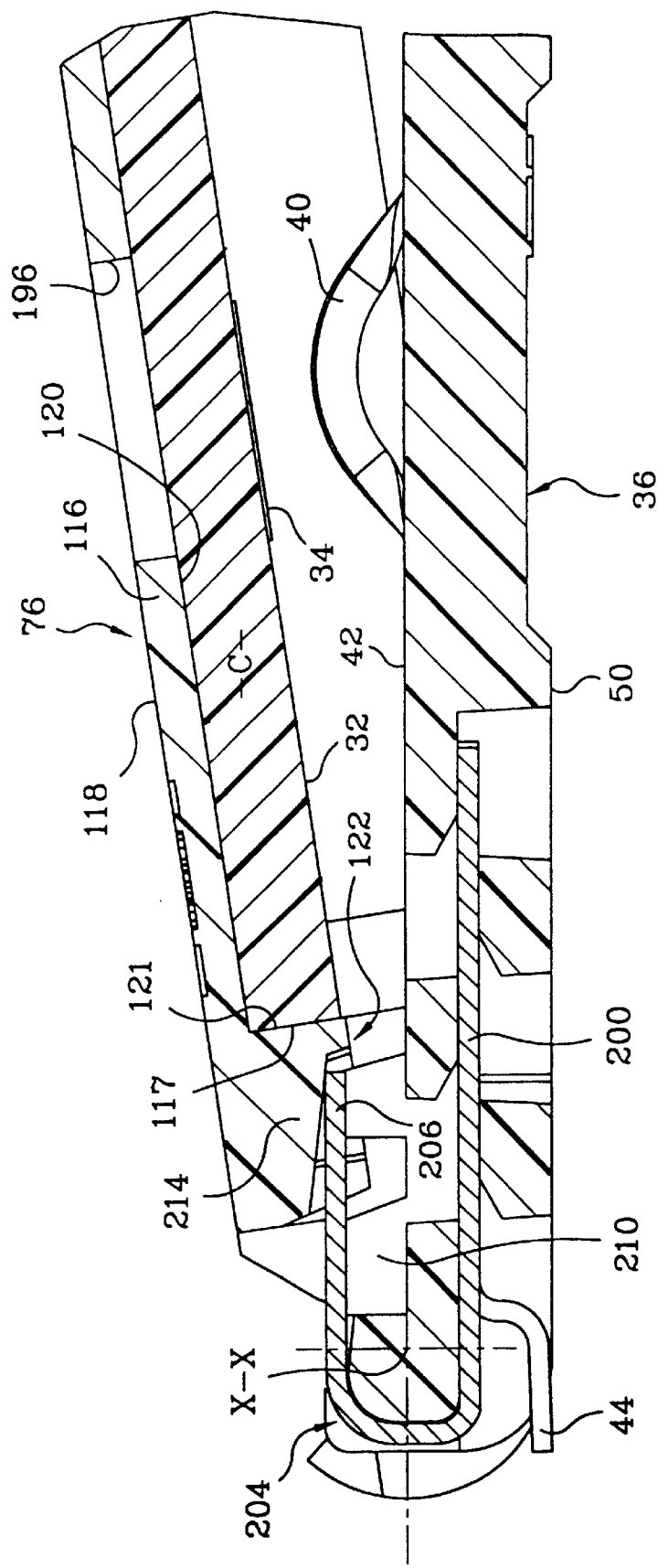
FIG. 21 is a sectional view taken on line 21—21 of FIG. 11.

FIG. 16 shows that the rear of the base has four largely rounded rear parts 208 around which the spring beams can extend. FIG. 20 shows the spring beams 206 extending around the rear parts of the base and lie between flanges 210, 212 formed in the base. FIG. 19 shows that the rear end of the cover 76 has four pushers 214 that press against the forward ends of the spring beams 206 when the cover approaches its fully lowered position. Of course, when the locking bar locks the cover to the base in the lowered position of the cover, the cover cannot pivot up. However, when the locking bar is slid rearward to a release position, the four spring beams 206 press up against the pushers 214 to raise the cover. The front end of the cover does not have to be raised more than about 1 mm before the smart card can be pulled out and another smart card can be inserted. However, it is often desirable to pivot the cover higher so a person can more easily see the cavity into which the card should be inserted. The spring beam pivots up the cover sufficiently for the card to be inserted or withdrawn.

II. Detailed Description of the Invention.

Each of the front and rear contacts 38 (FIG. 12) of the connector is mounted on the base by inserting the connector forwardly (for the front four contacts) or rearwardly into slots in the base. It also possible for the base to be over-molded around the contacts. Each contact has a free contacting end 40 that projects above the upper face 42 of the base. Each contact has another free end or tail 44 that is soldered to a conductive trace 302 on the circuit board 300 on which the base lies. The base can have downwardly extending studs that project into holes drilled into the circuit board. It is possible for such studs to raise the lower face 50 of the base above the circuit board, in which case it may be desirable to place a metal plate under the base for shielding (of electromagnetic radiation).

FIG. 5 shows that the base has laterally L spaced sides 52, 54, with the locking lugs 56, 58 at the front of each side. FIG. 6 shows that each locking lug 56, 58 is recessed from the bottom face 50 of the rest of the base to leave a clearance for the locking bar.

FIG. 3 shows that the cover includes the side walls 78, 80 which are joined near the front ends 82, 84 by a transverse or laterally-extending platform in the form of a flat strip 86. The upper face 88 of the platform constitutes a setting plane P on which the lower face of the card is positioned when the card is inserted into the card receiving cavity 31 of the cover. The rear edge 87 of the platform has a notch 89 for passage of the polarizing finger 66 (FIG. 5). The front edge of the platform has a recess 85 (FIG. 3) that makes it easier to manipulate the card during its insertion and to make it easier to extract the card.

Figure 10:
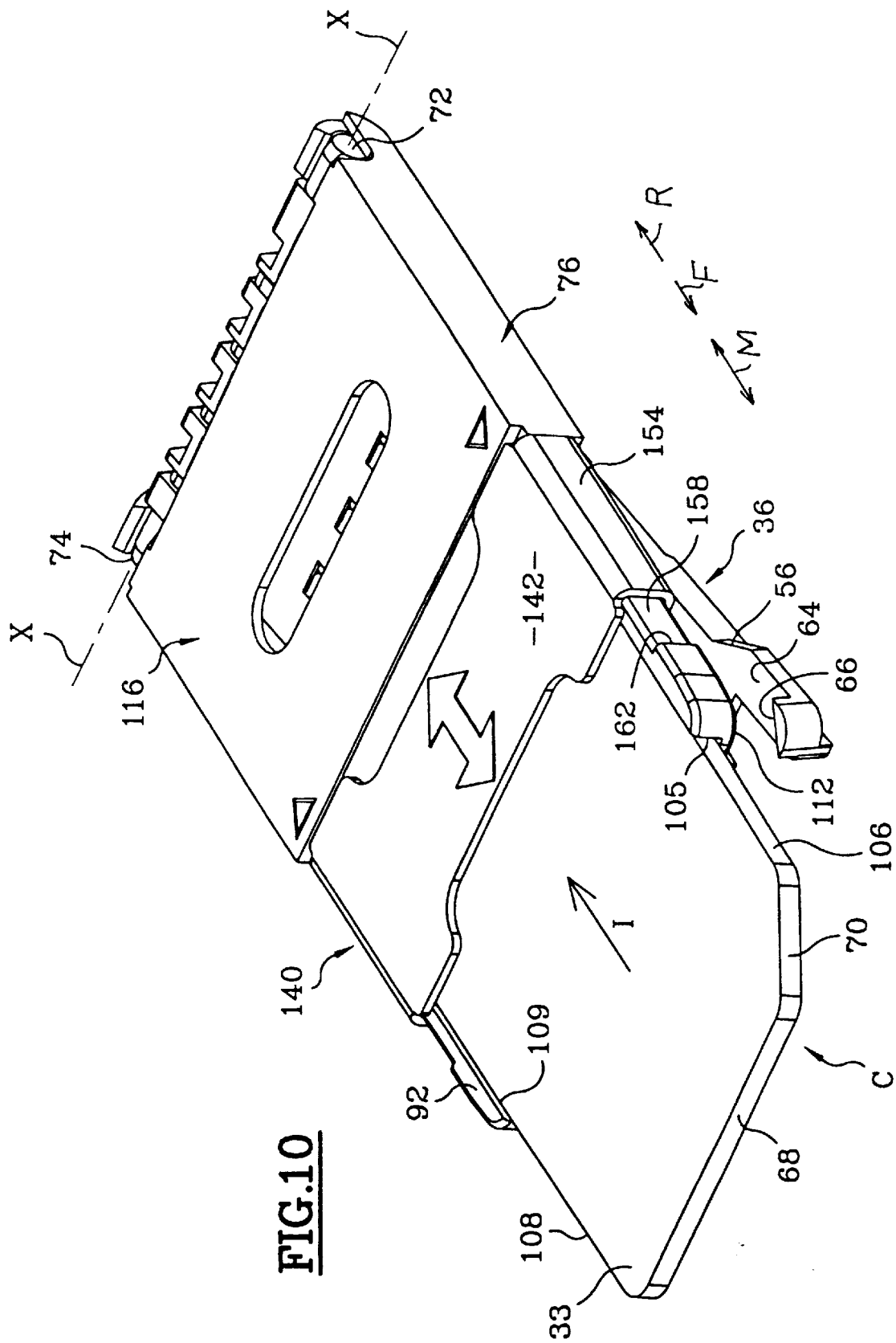
FIG. 10 is a view similar to that of FIG. 9, but with a card of the SIM or MICROSIM type partially inserted into the cover.

The setting plane P lies at the upper faces 94, 96 of slideways 98, 100 of the side walls, and the upper face 88 of the platform 86. The walls forming the guide surfaces for the plane P extend along a majority of the length of the front half of the cover, and are shown extending along substantially the entire front half of the cover. The plane of the upper faces 94, 96, 88 are downwardly offset with respect to the upper face 92 of the cover front half. This forms the edge guides 105, 109 that guide opposite side edges 106, 108 (FIG. 10) of the card. The bottom faces 112, 114 (FIG. 4) of most of the side walls are offset upward with respect to the lower face 110 of the cover. The channels of the locking bar slide along the lower faces 112, 114. Between the lower face 120 (FIG. 3) of the rear upper plate 116 and the setting plane P there is a vertical clearance which is slightly larger than the thickness of the card C. This allows forward insertion of the card under the plate 116 until the front transverse edge 117 of the card (FIG. 12) abuts a rear edge 121 (FIG. 4) of a thick part 122 at the rear end 124 of the plate 116 of the cover. The plate 116, therefore, helps press down the cover against the contacts while helping guide the card at the end of its rearward insertion. The rear end of the cover forms the arms 126, 128 that receive the pivot pins on the base. Lateral cheeks 131 (FIG. 3) help reinforce the rear wall of each slot 134, 136.

Although the base 36 (FIG. 12) is usually fixed to the printed circuit board, the cover can be removed from the base when the cover is raised by pulling it forward F. Although the bearing arms may be damaged during disconnection, this is not of serious consequence since the cover can be replaced.

In mass production, the base and cover can be assembled with the base lying in a horizontal plane as shown in FIG. 12, and with the cover pivoted 180° from its closed position so the cover extends rearwardly R from the base. With the slots and the bearing arms lying over the pivot pins on the base, the end of the cover lying over the base is pressed down to snap the bearing arms onto the pivot pins such as 72.

The locking bar can be formed with the lateral middle 142 (FIG. 7) of its plate bent slightly downward to frictionally engage the inserted card. This can help to prevent rattling of the locking bar and card. The plate 42 of the locking bar has a thickness approximately equal to the thickness of the cover rear plate 116 (FIG. 9), so the locking bar does not increase the thickness of the entire connector. The plate 142 (FIG. 7) of the locking bar has front and rear transverse edges 144, 146, with central recesses 148, 150. The rearmost recess provides access to the frontmost row of contacts. The locking bar is symmetrical, in order to make it easier to assemble the components automatically.

Forward sliding of the locking bar is limited when front edges 166, 168 (FIG. 2) of the bar abut shoulders 162, 164 formed in the cover. Rearward sliding is limited when rear edges 146 of the locking bar abut the front edge 152 of the top plate 116 of the cover. FIG. 7 shows that the channels 180 of the locking bar are formed by side walls 154, 156 and bottom walls 172, 174. As discussed above, the bottom walls 172, 174 slide under lugs at the front of the base to lock the cover in a downward position.

The center recesses 148, 150 (FIG. 1) in the plate 142 of the locking bar, have several functions. They allow the locking bar to be moved longitudinally between its front and rear extreme positions using a fingernail or the tip of the tool pressed against the recess walls. In the absence of a card, the rear recess 150 makes it possible to check the front row of contacts 38. As mentioned earlier, the rear row of contacts may be checked through the window 196 in the upper plate 116 at the rear half of the cover. The front recess 148 makes it possible to solder the connection ends or tails 44 of the contacts, even when the locking bar is in its front position. It is noted that the connector is generally delivered with the cover 76 closed and the locking bar in its front position to lock the cover in its lowered position. In this position, the tails 44 of both the front row and rear row of contacts are soldered to traces on the circuit board.

Figure 2:
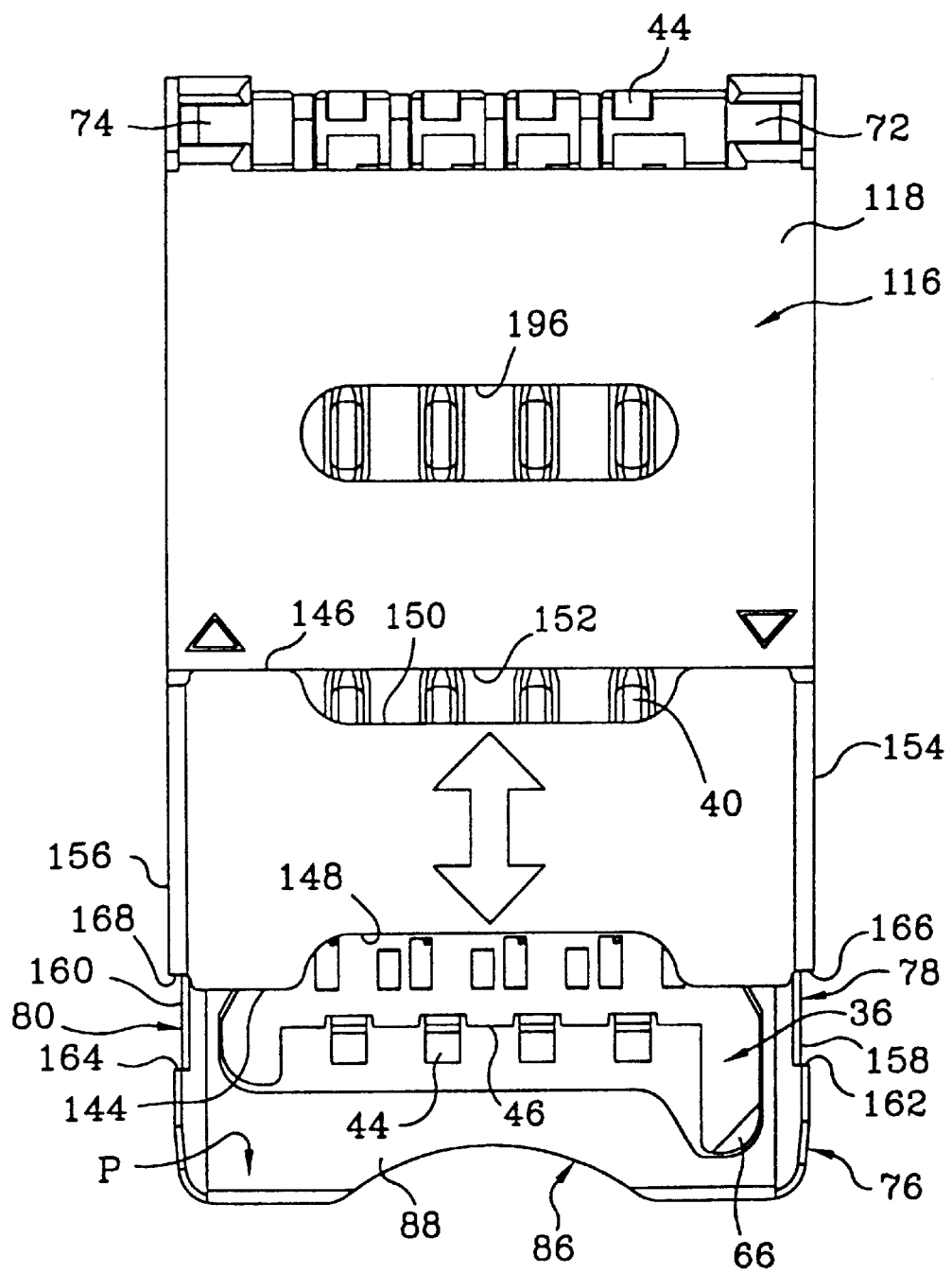
FIG. 2 is a view similar to FIG. 1, with the locking bar in the unlocked rear position.

To insert a card, the user moves the locking bar 140 rearward, from the position of FIG. 1 to that of FIG. 2. The cover then tends to pivot up, and can be further pivoted up in order for a person to easily view the slot or cavity into which the card is inserted. If the cover does not pivot up, a person can use a fingernail or tool under the edge of the front recess 85 of the cover. In proper operation, the cover is automatically pivoted upward by the spring beams of the rear contacts.

With the cover raised, the card can be easily slid into position. It is preferred that the card be laid with the card extending at a slight angle of about 10° to 15° from the setting plane P (FIG. 3) of the cover. The card can be inserted using only one hand.

After the rear edge of the card has been laid on the top of the front of the cover, the card can be moved from one side to the other until it is captured between the inner side walls 105, 109 of the cover, preferably with the leading edge of the card against the upper face 88 of the platform 86. The card is then laid flat against the plane P and pushed rearwardly. The card is guided along a front portion of the card-receiving cavity, between the lower face 143 (FIG. 7) of the locking bar and the surfaces of the setting plane P (FIG. 3). Insertion continues until the rear edge of the card abuts the transverse edge 121 (FIG. 4).

Rearward insertion of the card occurs despite the fact the setting plane P (FIG. 3) is formed by surfaces 96, 98, 88 extending only along the front half of the cover. The orientation of the front half of the card is controlled by the narrow space between the bottom of the locking bar plate 142 and the surfaces of the setting plane P (FIG. 3). The length of the opposite sides of the plate 142 (FIG. 9) is more than half the length of the front half of the cover, so the card can only slightly pivot up or down. Even if the card rear end should move down slightly, it will not move laterally because of the tall side surfaces 111, 113 and tall stops at 119, 123.

The sheet metal locking bar can be advantageous in helping to shield the card from EMI (electromagnetic radiation). However, the presence of the metal locking bar may run the risk of short circuiting components placed on the circuit board near the connector. To avoid such short circuiting, it is possible to make the locking bar of an insulating plastic by molding it. It is also possible to coat the entire locking bar or at least the outer surfaces of the channels 180 with a thin layer of insulating material.

It is possible to remove any harmful electrostatic charge on the card, before making electrical contact between the contact pads on the card and the contact elements. This can be done by forming a metal coating at the notches 184, 190 (FIG. 4) and with the coating extending down to a grounded trace on the circuit board. It is also possible to provide a thin metal coating on the cover, which extends to one of the spring beams 206 (FIG. 18) that is connected to a grounded trace on the circuit board. These arrangements discharge static electricity before contact is made with the contact pads of the card.

FIG. 26 shows a connector 30' which can receive an elongated card C' shown in FIG. 27. The card C' is a "MICROSIM SPECIAL" card which extends forwardly beyond the connector 30'. The projecting part 230 of the card may be thicker (upward and downward) to carry the components such as a telephone connect socket. An example of such a card C' is a "NEXFLASHMEDIA-STICK" card sold by Nexcom Technology, Inc., which stores data for photographs and other uses. In the connector 30' of FIG. 26, a lug 238 at the front of the base does not have a polarizing finger, which allows a longer card to be inserted.

FIG. 27 shows that the special card has special contact pads on its lower face, with one pad area 35 being constructed to contact two contacts at the pad-engaging parts 38. This forms a switch for detecting the presence of the card in the fully installed position when the cover 36 is closed and locked. Thus, without modifying the base 36, except for the polarizing finger, the connector can be used with MICRO-SIM cards of extra length.

Figure 22:
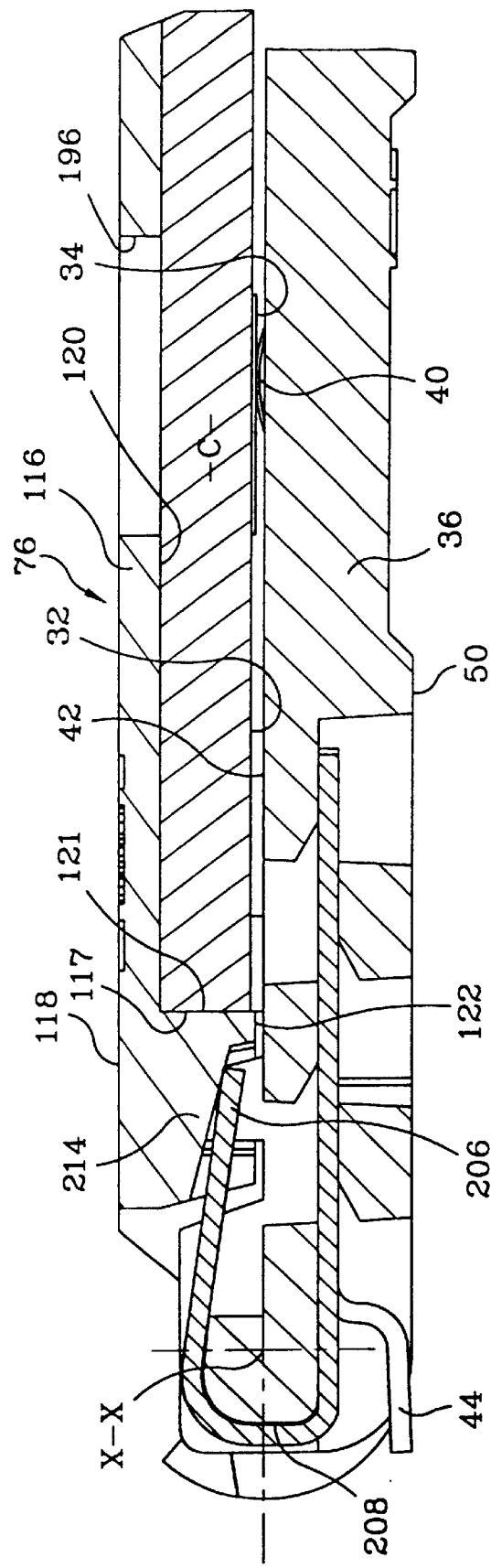
FIG. 22 is a view similar to that of FIG. 21, taken on line 22—22 of FIG. 13.

FIG. 22 shows the cover closed, with pushers 214 of the cover downwardly deflecting the spring beams 206 formed on the contacts. When the locking bar is pushed forward to its release position, the spring beams pivot up the cover about the axis X—X to a predetermined angle of about 15° from the horizontal. The predetermined angle allows the card to be inserted without the contact pads 34 of the card rubbing against the pad-engaging or contacting ends 40 of the contacts during insertion. Because of the arrangement of the spring beams near the axis of pivoting of the cover, the cover does not spring up suddenly, but moves up relatively slowly to the predetermined angle.

Figure 23:
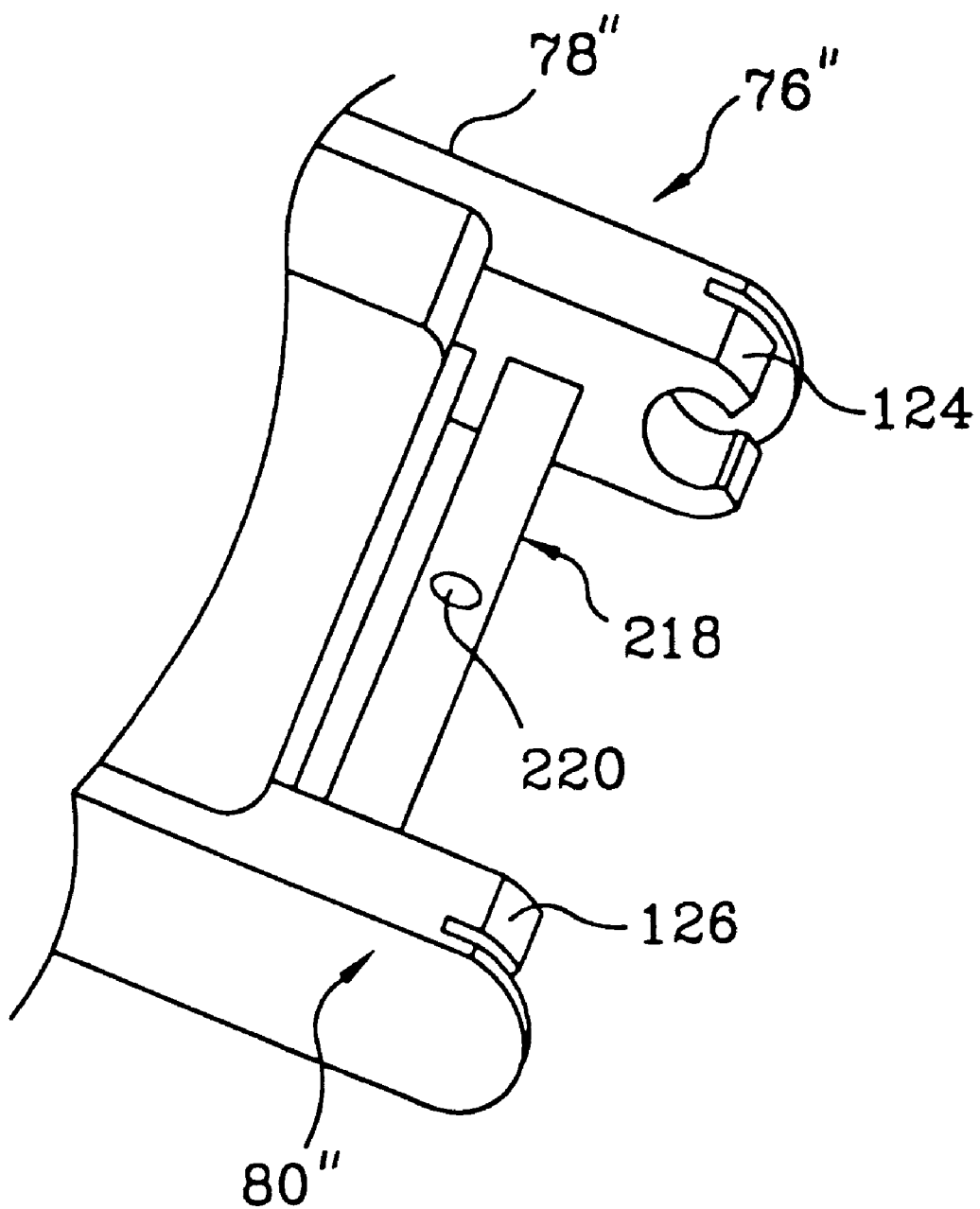
FIG. 23 is an upside-down isometric view of the rear part of a cover constructed in accordance with another embodiment of the invention.

FIG. 23 shows another means for initially raising the cover from its lowered position when the locking bar is moved to its release position. In FIG. 23, the cover 76", which is shown upside-down, has a transverse beam 218 which joins the rear ends of side walls 78", 80". The lower face of the transverse beam has a downwardly-projecting pusher 220 which, in the closed position of the card, engages a location on the base. This causes resilient bending of the beam 218, so the beam urges the cover to pivot up. The beam can strengthen the rear of the cover to help it withstand deformation under the heat of reflow soldering or in brazing operations.

Figure 24:
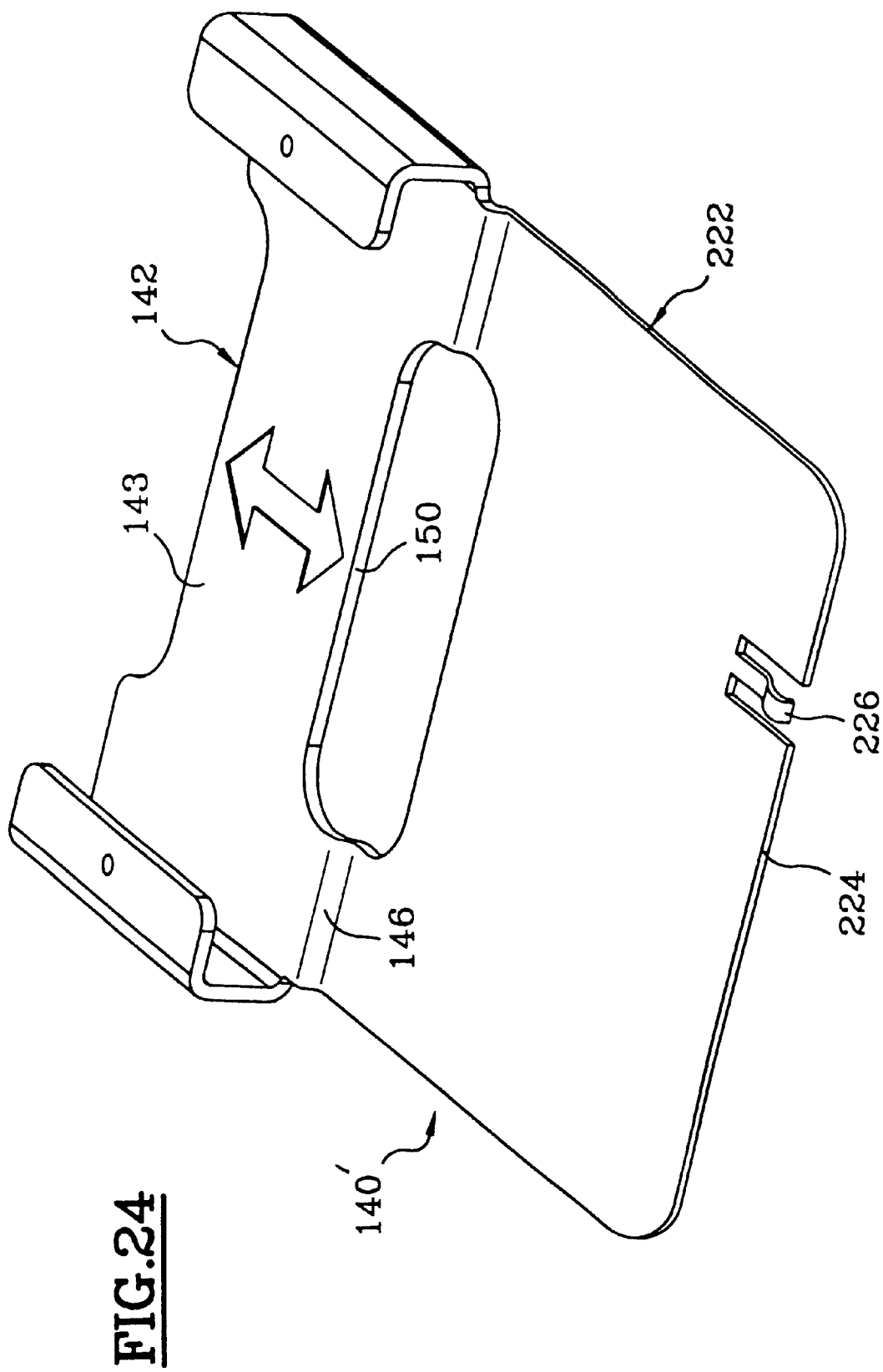
FIG. 24 is a view similar to that of FIG. 7, showing a locking bar of another embodiment of the invention.
Figure 25:
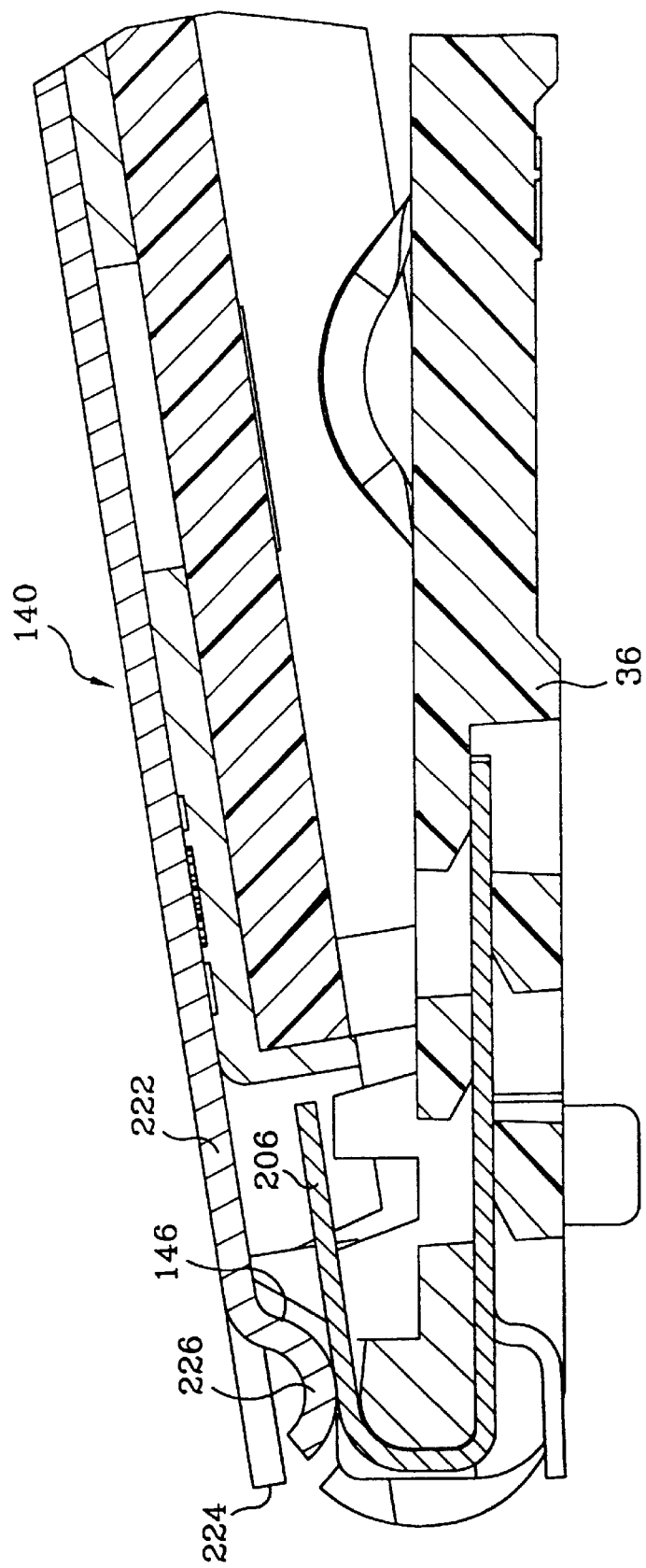
FIG. 25 is a view similar to that of FIG. 21, with the locking bar of FIG. 24 mounted on the connector.

FIG. 24 shows a metal locking bar 140' which is extended rearwardly by an extension 222. The extension lies in a plane that is upwardly offset with respect to the plate 142 of the locking bar. The extension has a tab 226 which extends downwardly. As shown in FIG. 25, the tab 226 engages the spring beam 206 of a rear contact. As a result, contact of the card with the locking bar can dissipate any electrostatic charge on the card to a ground trace on the circuit board. In a closed position of the connector, the extension 222 also improves shielding of the connector. The extension of the sheet metal locking bar avoids the need to partially metallize the molded plastic cover in order to obtain EMI shielding.

FIG. 26 illustrates another embodiment of the invention, where the platform or strip 86 that extends across the front end of the cover, has a lower face that forms a recess; that is, the lower face of the strip at 86 as raised with respect to the cover lower face 110. This reduces the area over which the cover lower face 110 bears against the circuit board. The cover has tabs 234 (FIG. 29) on opposite sides, which are designed to bear against the upper faces of tabs 238 on the base, at the lugs 56, 58. The rear part of the connector is of simplified construction because only a single contact 38 has a spring beam 206 and the cover has only a single corresponding pusher 214.

The connector of the present invention has a size that is significantly reduced from that of the prior art. For a smart card thickness of about 0.80 mm, the thickness of the connector is reduced from the prior 3 mm to the present 2.5 mm, its length is reduced from the prior 30.5 mm to a present 29.6 mm, and the width is reduced from 20.5 mm to 17.5 mm.

While terms such as "upper", "lower", etc. are used to help describe the invention as it is illustrated, it should be understood that the connector can be used in any orientation. It is also possible to have the locking bar move rearward to lock and forward to release, by shifting the lugs on the base rearward so they engage the locking bar when the locking bar is shifted rearward.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. Apparatus for connection to a smart card that has laterally opposite sides and a lower surface with contact pads thereon, comprising:

a largely plate-shaped base having an upper face;

a plurality of contacts mounted on said base and having pad-engaging parts at said upper face of said base for engaging said smart card contact pads;

a cover having longitudinally-spaced front and rear ends with said rear end pivotally connected to said base to allow said cover to pivot between raised and lowered cover positions, with said cover having a card-receiving cavity for receiving said smart card so the contact pads of the card engage said pad-engaging parts of said contacts when said cover is in said lowered cover position;

said cover and said cavity each having front and rear portions, with said cover rear portion having a rear top plate lying over said cavity rear portion to hold down a rear half of said card, and said cover front portion being open above said cavity front portion; and including a locking bar that includes a plate-like part lying over said cavity front portion to hold down said card, with said locking bar being forwardly and rearwardly slideable on said cover to engage and disengage said base to lock and unlock said cover in said lowered cover position.

2. The apparatus described in claim 1 wherein:

said base has a front end with a largely downwardly-facing shoulder;

said locking bar has a downwardly-extending part that slides under said shoulder when the locking bar is slid to its forward position.

3. The apparatus described in claim 1 wherein:

said cover has laterally opposite side walls;

said locking bar has laterally opposite sides forming channels that extend around said laterally opposite side walls to guide said locking bar in longitudinally sliding along said side walls.

4. The apparatus described in claim 1 wherein:

said base has a predetermined lateral base width along most of its longitudinal length;

said cover has a lateral cover width that is greater than said base width, and said cover has side walls that lie on laterally opposite sides of said base and extend below the upper face of said base.

5. The apparatus described in claim 1 wherein:

said top plate has at least one through aperture that leads to said padengaging parts of a plurality of said contacts.

6. The apparatus described in claim 1 wherein:

said contacts are formed of sheet metal and one of said contact has a strip that is bent to be deflected by said cover as said cover reaches said closed position to resiliently urge said cover open.

7. The apparatus described in claim 1 wherein said smart card is of substantially rectangular shape with four corners except that a front end of said card has a polarized diagonal corner area, and wherein:

said base has a front end with an upstanding polarizing finger;

said cover has a notch that passes said polarizing finger to lie at said diagonal corner area of a fully installed smart card only when the cover lies in the cover lowered position, whereby to avoid an obstruction to card insertion until the cover has pivoted down to its lowered position.

8. Apparatus for connection to a smart card that has laterally opposite sides and a card lower surface with contact pads thereon, comprising:

a largely plate-shaped base having an upper surface;

a plurality of contacts mounted on said base and having pad-engaging parts at said upper face of said base for engaging said smart card contact pads;

a cover having a longitudinal-spaced front and rear ends with said rear end pivotally connected to said base to allow said cover to pivot between raised and lowered cover positions, with said cover having a cavity forming a card receiver for receiving said smart card so the contact pads of the card engage said pad-engaging parts of said contacts when said cover is in said lowered position; and said cover has opposite sides with side walls at said sides, said cover and said cavity each having front and rear portions, with said cover rear portion having a rear top plate lying over said cavity rear portion to hold down a rear half of said card, and said cover front portion being open above said cavity front portion, said cover front portion having guides extended from opposite said side walls for guiding said card into said cavity that forms said card receiver, with said sides lying on opposite sides of said base and below said upper face in said lowered cover position.

9. The apparatus described in claim 8 wherein:

said cavity that forms said card receiver, and said card, each have a predetermined lateral width;

said base has longitudinally-spaced front and rear ends, and said base has a lateral width along most of its longitudinal length, which is less than said predetermined lateral width of said card.

10. The apparatus described in claim 8 wherein:

said base rear end has opposite sides with laterally extending pivot pins extending away from each other at said opposite sides;

said cover has a pair of arms with recess that receive said pivot pins to pivotally mount said cover on said base;

said arms lie at opposite sides of said base rear end and below said base upper face.

11. Apparatus for connection to a smart card that has laterally opposite sides and a card lower surface with contact pads thereon, comprising:

a largely plate-shaped base having an upper face;

a plurality of contacts mounted on said base and having pad-engaging parts at said upper face of said base for engaging said smart card contact pads;

a cover having longitudinally-spaced front and rear ends with said rear end pivotally connected to said base to allow said cover to pivot between raised and lowered cover positions, with said cover having a card cavity for receiving said smart card so the contact pads of the card engage said pad-engaging parts of said contacts when said cover is in said lowered cover position;

said cover having laterally opposite side walls forming surfaces that face each other and that form opposite edges of said card cavity, with said cover having a rear portion forming a plate that lies over said card cavity and with said cover having a front portion which is open between said side walls;

a locking bar that has a plate portion lying over part of the front portion of said cover and having opposite sides that are slidably mounted on said cover side walls to guide the locking bar in sliding between forward and rearward bar positions, with said locking bar having a part that locks to said base in one of said bar positions.

12. The apparatus described in claim 11 wherein:

said side walls of said cover have parts that lie on opposite sides of said base and below said base upper face in the closed position of the cover.

13. Apparatus for connection to a smart card that has laterally opposite sides and a lower surface with contact pads thereon, comprising;

a base having an upper face;

a plurality of contacts mounted on said base and having pad-engaging parts at said upper face of said base for engaging said smart card contact pads;

a cover having longitudinally-spaced front and rear ends with said rear end pivotally connected to said base to allow said cover to pivot between raised and lowered cover positions, with said cover having a card-receiving cavity for receiving said smart card so the contact pads of the card engage said pad-engaging parts of said contacts when said cover is in said lowered cover position;

a latch that retains said cover in said lowered cover position;

at least one of said contacts has a part forming a spring beam that lies in the path of said cover so the spring beam is resiliently deflected as the cover approaches its lowered cover position to urge the cover to pivot up away from said lowered cover position.

14. The apparatus described in claim 13 wherein:

said at least one of said contacts is grounded;

said latch is a sheet metal locking bar that includes a plate that lies above at least part of said card-receiving cavity, and with said latch having a part that engages said card and another part that engages said spring beam before the cover reaches said lowered cover position. whereby to discharge static electricity.

15. The apparatus described in claim 13 wherein:

said contact has an elongated strip that is bent into a U-shape with primarily horizontal lower and upper strip parts joined by a primarily vertical strip part, with said upper strip part forming at least part of said spring beam.

* * * * *